US008505072B2

(12) United States Patent
Tsukidate

(10) Patent No.: US 8,505,072 B2
(45) Date of Patent: Aug. 6, 2013

(54) NETWORK APPARATUS, ASSESSMENT METHOD, PROGRAM, AND INTEGRATED CIRCUIT

(75) Inventor: Ryota Tsukidate, Osaka (JP)

(73) Assignee: Panasonic Corporation, Osaka (JP)

( * ) Notice: Subject to any disclaimer, the term of this patent is extended or adjusted under 35 U.S.C. 154(b) by 176 days.

(21) Appl. No.: 13/122,806

(22) PCT Filed: Aug. 12, 2010

(86) PCT No.: PCT/JP2010/005059
§ 371 (c)(1),
(2), (4) Date: Apr. 6, 2011

(87) PCT Pub. No.: WO2011/021378
PCT Pub. Date: Feb. 24, 2011

(65) Prior Publication Data
US 2011/0197262 A1    Aug. 11, 2011

(30) Foreign Application Priority Data
Aug. 20, 2009  (JP) .................................. 2009-191116

(51) Int. Cl.
*G06F 21/00*    (2006.01)
(52) U.S. Cl.
USPC .................... 726/3; 726/4; 380/270; 713/153
(58) Field of Classification Search
USPC ........................................................... 726/3
See application file for complete search history.

(56) References Cited

U.S. PATENT DOCUMENTS

| 5,467,341 A | * | 11/1995 | Matsukane et al. | 370/253 |
| 5,583,486 A | * | 12/1996 | Kersten | 340/572.1 |
| 5,745,559 A | * | 4/1998 | Weir | 379/199 |
| 6,011,473 A | * | 1/2000 | Klein | 340/571 |

(Continued)

FOREIGN PATENT DOCUMENTS

| JP | 9-27087 | 1/1997 |
| JP | 2005-285099 | 10/2005 |

(Continued)

OTHER PUBLICATIONS

International Search Report issued Sep. 14, 2010 in International (PCT) Application No. PCT/JP2010/005059.
Technical Details on Microsoft Product Activation for Windows XP, Windows Product Activation Technical Market Bulletin.doc, Aug. 2001.

*Primary Examiner* — Kambiz Zand
*Assistant Examiner* — Yonas Bayou
(74) *Attorney, Agent, or Firm* — Wenderoth, Lind & Ponack, L.L.P.

(57) ABSTRACT

A network device restricts functions thereof in a special case such as theft, and comprises: an acquisition unit for acquiring one or more identification information pieces corresponding to one or more local devices in a communicable state; a calculation unit for calculating an index value for each local device; a holding unit for holding, for each local device whose identification information piece was acquired in the past, the identification information piece of the local device and the index value thereof; a difference specifying unit for specifying a difference between (i) one or more identification information pieces currently acquired and (ii) the one or more identification information pieces acquired in the past, thereby specifying a local device as the difference; and a judgment unit for judging whether to restrict the access based on the index value of the local device specified as the difference.

17 Claims, 16 Drawing Sheets

(56) References Cited

U.S. PATENT DOCUMENTS

| | | | |
|---|---|---|---|
| 6,151,493 A * | 11/2000 | Sasakura et al. | 455/421 |
| 6,614,350 B1 * | 9/2003 | Lunsford et al. | 340/572.1 |
| 6,865,673 B1 * | 3/2005 | Nessett et al. | 713/155 |
| 7,715,831 B2 * | 5/2010 | Wakefield | 455/418 |
| 7,810,138 B2 * | 10/2010 | Vank et al. | 726/4 |
| 2001/0052846 A1 * | 12/2001 | Jespersen | 340/539 |
| 2003/0110240 A1 * | 6/2003 | Lockridge et al. | 709/220 |
| 2005/0203870 A1 | 9/2005 | Yamada et al. | |
| 2006/0059096 A1 | 3/2006 | Dublish et al. | |
| 2007/0147777 A1 | 6/2007 | Kurosawa | |
| 2008/0014869 A1 * | 1/2008 | Demirbasa et al. | 455/41.2 |
| 2009/0075593 A1 * | 3/2009 | Demirbasa et al. | 455/41.2 |
| 2010/0293246 A1 | 11/2010 | Urazoe et al. | |

FOREIGN PATENT DOCUMENTS

| | | |
|---|---|---|
| JP | 2006-85718 | 3/2006 |
| JP | 2007-181143 | 7/2007 |
| JP | 2007-219985 | 8/2007 |
| JP | 2009-169896 | 7/2009 |

* cited by examiner

FIG. 4A

Present information 10
↙ ╱ 11

| Identification information |
|---|
| 120 — 00:00:0C:07:AC:0B |
| 130 — 00:00:0C:06:BC:1D |
| 140 — 00:00:0C:09:AD:5B |
| 150 — 00:00:0C:07:BD:3C |
| 160 — 00:00:0C:06:AC:5D |

FIG. 4B

| Identification information |
|---|
| 170 — 00:00:0C:09:BC:1B |
| 180 — 00:00:0C:06:BC:1F |
| 190 — 00:00:0C:07:BD:0B |

FIG. 4C

| Identification information |
|---|
| 120 — 00:00:0C:07:AC:0B |
| 130 — 00:00:0C:06:BC:1D |
| 150 — 00:00:0C:07:BD:3C |

FIG. 4D

| Identification information |
|---|
| 120 — 00:00:0C:07:AC:0B |
| 130 — 00:00:0C:06:BC:1D |
| 140 — 00:00:0C:09:AD:5B |

FIG. 4E

| Identification information |
|---|
| 130 — 00:00:0C:06:BC:1D |
| 140 — 00:00:0C:09:AD:5B |
| 150 — 00:00:0C:07:BD:3C |

FIG. 5A

Local device information 20

| Identification information | Existence count (N) | Nonexistence count (M) | Measurement count (N+M) | Existence probability (N/(N+M)) |
|---|---|---|---|---|
| 00:00:0C:07:AC:0B | 99 | 1 | 100 | 99% |
| 00:00:0C:06:BC:1D | 50 | 50 | 100 | 50% |
| 00:00:0C:09:AD:5B | 20 | 60 | 80 | 25% |
| 00:00:0C:07:BC:3C | 9 | 1 | 10 | 90% |

| Identification information | Existence count (N) | Nonexistence count (M) | Measurement count (N+M) | Existence probability (N/(N+M)) |
|---|---|---|---|---|
| 00:00:0C:07:AC:0B | 100 | 1 | 101 | 99% |
| 00:00:0C:06:BC:1D | 51 | 50 | 101 | 50% |
| 00:00:0C:09:AD:5B | 21 | 60 | 81 | 26% |
| 00:00:0C:07:BD:3C | 10 | 1 | 11 | 91% |
| 00:00:0C:06:AC:5D | 1 | 0 | 1 | 100% |

120
130
140
150
160

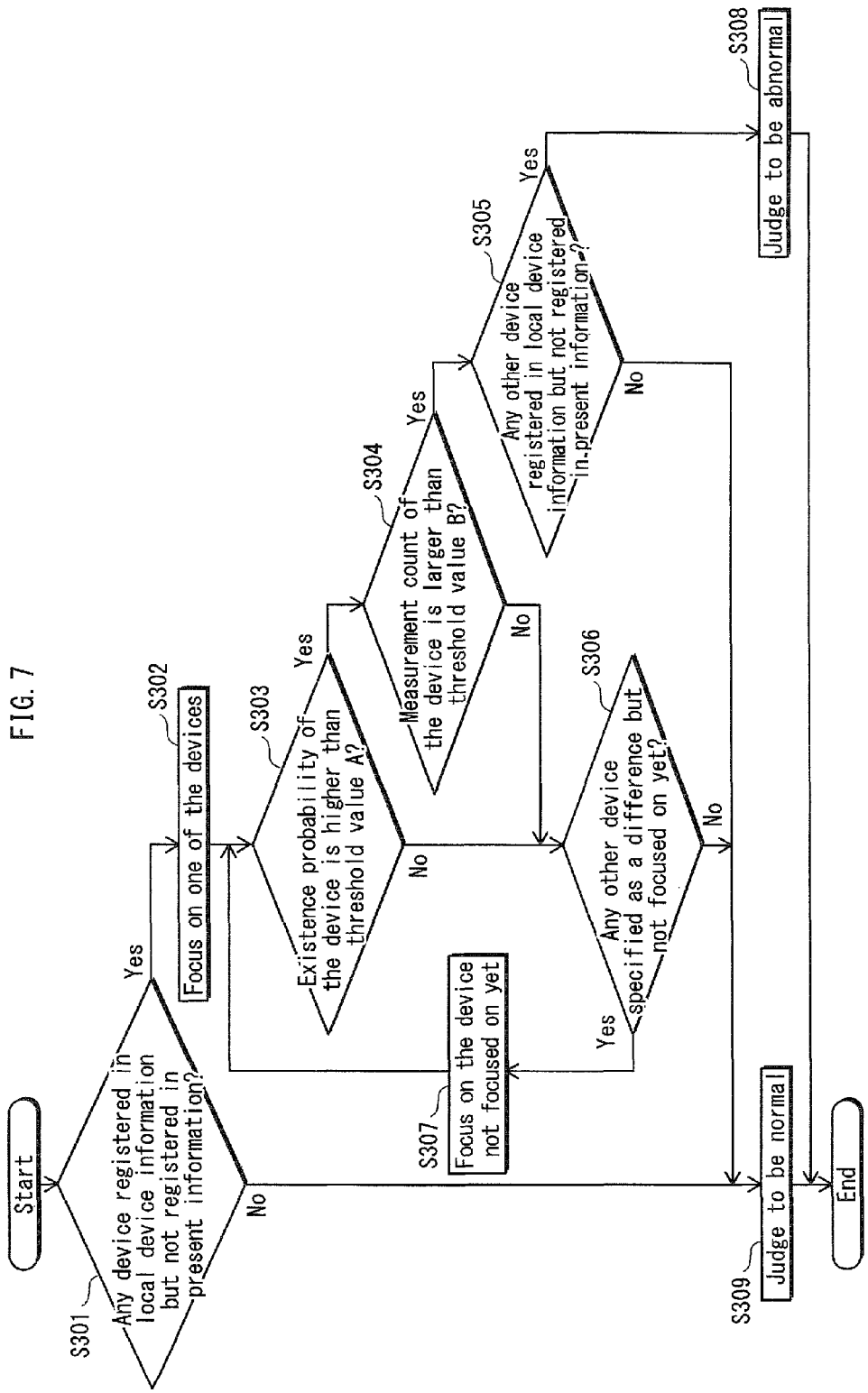

FIG. 8A

Local device information 30

| | Identification information | Communication time | Communication time ratio |
|---|---|---|---|
| 120 | 00:00:0C:07:AC:0B | 100 | 50% |
| 130 | 00:00:0C:06:BC:1D | 50 | 25% |
| 140 | 00:00:0C:09:AD:5B | 40 | 20% |
| 150 | 00:00:0C:07:BD:3C | 10 | 5% |

| | Identification information | Communication time | Communication time ratio |
|---|---|---|---|
| 120 | 00:00:0C:07:AC:0B | 100 | 45% |
| 130 | 00:00:0C:06:BC:1D | 70 | 32% |
| 140 | 00:00:0C:09:AD:5B | 40 | 18% |
| 150 | 00:00:0C:07:BD:3C | 10 | 5% |

FIG. 12A

Host name information 40

| Host name log | Common part |
|---|---|
| 1. tokyo. panasonic. com | *. osaka-network. jp |
| 3. tokyo. panasonic. com | |
| 5. tokyo. panasonic. com | |
| 123. panasonic. osaka. com | |
| 999. network-nagoya. jp | |

FIG. 12B

| Host name log | Common part |
|---|---|
| 123. panasonic. osaka. com | *. osaka-network. jp |
| 999. network-nagoya. jp | *. tokyo. panasonic. com |

FIG. 15A

Local device information 50

| Identification information | Type |
|---|---|
| 00:00:0C:07:AC:0B | Router |
| 00:00:0C:06:BC:1D | HUB |
| 00:00:0C:09:AD:5B | AV device (Stationary device) |
| 00:00:0C:07:BD:3C | Mobile device |
| ⋮ | ⋮ |

FIG. 15B

Device index value table 60

| Type | Index value |
|---|---|
| Router | A |
| HUB | B |
| AV device (Stationary device) | B |
| Mobile device | B |

NETWORK APPARATUS, ASSESSMENT METHOD, PROGRAM, AND INTEGRATED CIRCUIT

TECHNICAL FIELD

The present invention relates to a network device, such as a home server used by being connected to another device via a network, and in particular to a technique for ensuring security of information held in the network device.

BACKGROUND ART

In recent years, home servers have been prevalent. A home server is a device for accumulating and distributing various contents (e.g., movies and music) by communicating, via a home network, with a recording/playback device, a digital camera that is connected to the home server as needed, or the like. Since the contents may include personal information, a security function is necessary that protects contents in case that a home server is stolen.

Conventionally, authentication is used as a means of ensuring security for contents protection. However, it is bothersome for a user to perform authentication for each use even though the home server is used at home where security is ensured.

Accordingly, a technique for ensuring security without relying on authentication is demanded for a home server, etc. As such a technique, the following is commonly known as prior art.

A device disclosed in Patent Literature 1 is based on the premise that the device is always connected to a network. When physically disconnected from the network, the device sets off an alarm, thereby preventing theft. However, according to this technique, although the alarm is set off, if the device is actually stolen, contents cannot be protected.

In this regard, Patent Literature 2 discloses a device designed in consideration of such theft. The device disclosed in Patent Literature 2 acquires positional information by receiving radio waves from a base station, judges whether contents are used at a legitimate position, and performs access restriction depending on a result of the judgment. The device enables access to the contents when the positional information indicates a predetermined place. Also, in case of theft or the like, the device disables access to the contents since the positional information, which is acquired by receiving radio waves from the base station, does not indicate the predetermined place.

CITATION LIST

Patent Literature

[Patent Literature 1] Japanese Patent Application publication No. H09-27087
[Patent Literature 2] Japanese Patent Application publication No. 2006-85718

SUMMARY OF INVENTION

Technical Problem

However, when located in a place in which the radio waves from the base station are not reached, the device disclosed in Patent Literature 2 is likely to fail in accurately judging whether the contents are being used in the legitimate place. This causes problem in general use.

Although a home server has been used as an example to describe the aforementioned problem, such a problem is common to all network devices which hold information to be protected and communicate with other devices via a network.

The present invention has been achieved in view of the above problem, and an aim thereof is to provide a network device that restricts functions thereof in a special case such as theft.

Solution to Problem

In order to solve the above problem, the present invention provides a network device that restricts access to predetermined information held therein, the network device comprising: an acquisition unit operable to communicate with one or more local devices that are in a communicable state within the same local area network as the network device, and acquire one or more identification information pieces corresponding thereto; a calculation unit operable, for each local device whose identification information piece has been acquired, to calculate an index value of the local device based on a past communication therewith, the index value used for judging whether to restrict the access and for estimating an existence probability of the local device, the existence probability being a ratio at which the local device exists in a communicable state; a holding unit operable, for each local device whose identification information piece was acquired before a given time point, to hold the identification information piece of the local device and the index value thereof calculated by the calculation unit; a difference specifying unit operable to specify a difference between (i) one or more identification information pieces acquired after the given time point and (ii) the one or more identification information pieces acquired before the given time point, thereby specifying one or more local devices as the difference; and a judgment unit operable to judge whether to restrict the access based on the index value of each local device specified as the difference.

Advantageous Effects of Invention

According to the present invention, the network device restricts functions thereof in a special case such as theft.

BRIEF DESCRIPTION OF DRAWINGS

FIGS. 4A-4E each show a data structure and details of present information 10.
FIGS. 5A and 5B each show a data structure and details of local device information 20.
FIG. 7 is a flowchart of abnormality judgment.
FIGS. 8A and 8B each show a data structure and details of local device information 30 according to Embodiment 2.
FIGS. 12A and 12B each show a data structure and details of host name information 40.

FIGS. 15A and 15B show a data structure and details of local device information 50 in a case where an index value is determined based on the type of a device.

DESCRIPTION OF EMBODIMENTS

Embodiment 1

The following describes a network device 100 according to Embodiment 1.

<General Outline>

Figure 1:
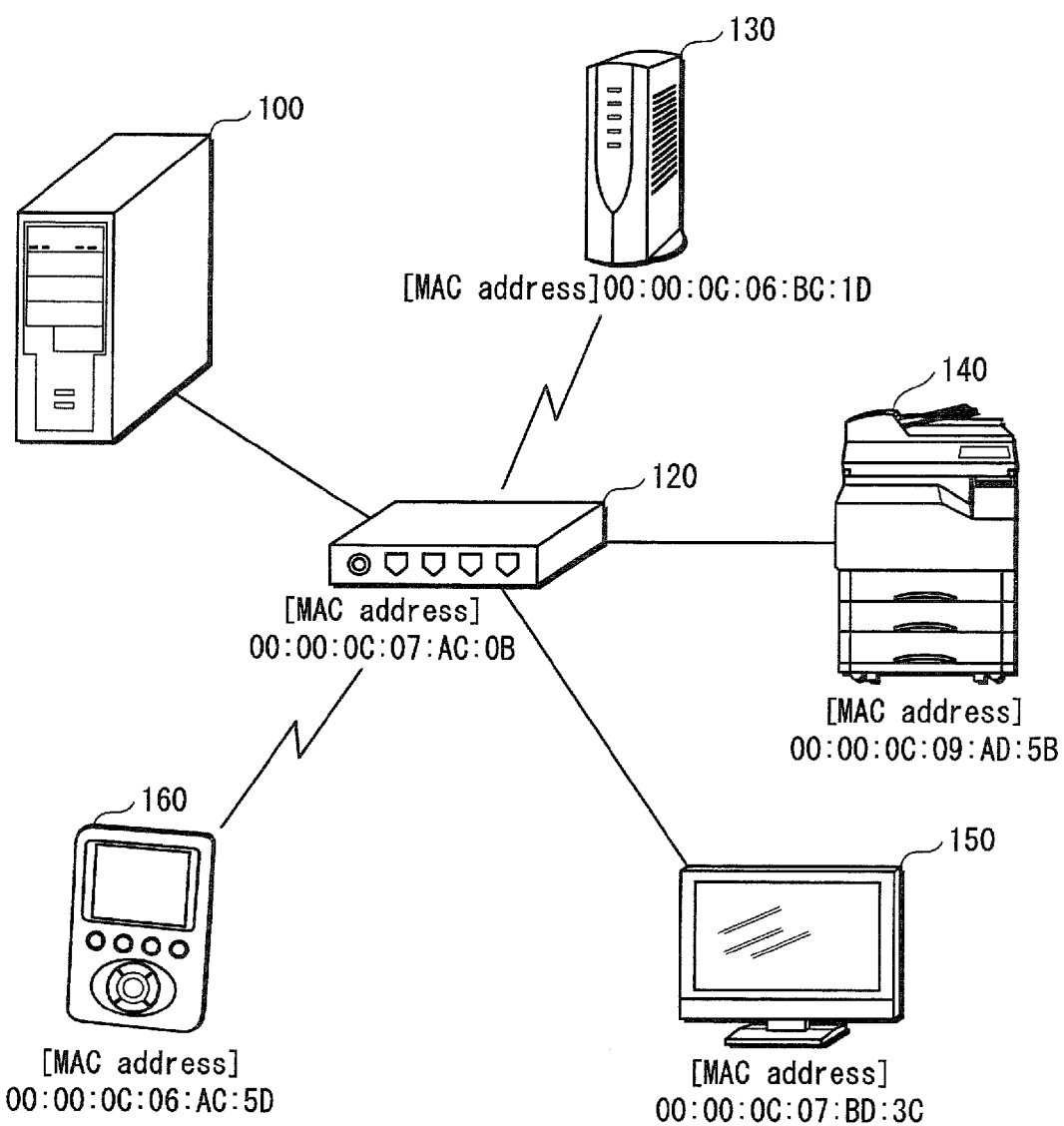
FIG. 1 shows a normal operating environment of a network device 100 according to Embodiment 1.
Figure 2:
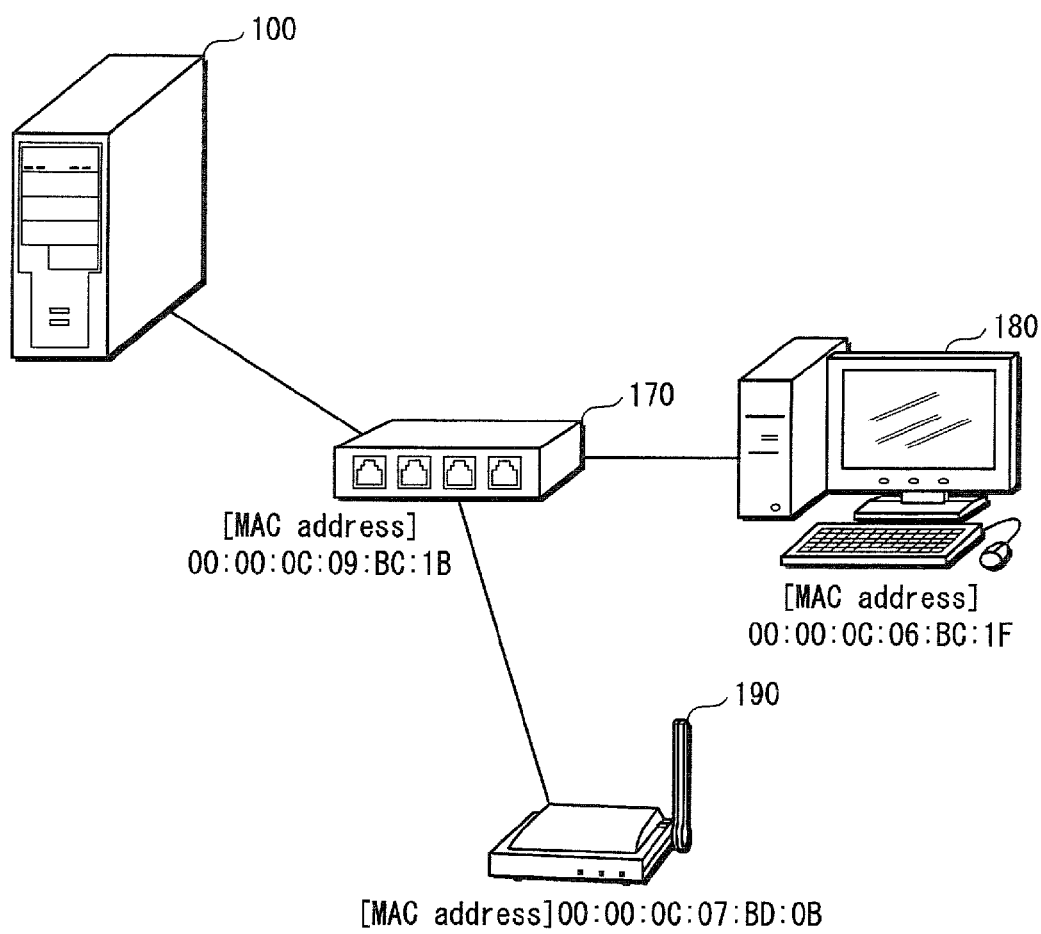
FIG. 2 shows an operating environment judged to be "abnormal" by the network device 100.

FIG. 1 shows an example of a normal operating environment of the network device 100 according to Embodiment 1. FIG. 2 shows an example of an operating environment judged to be "abnormal" by the network device 100.

The network device 100 is used as a home server, etc., and restricts access to contents held therein, based on a result of judgment as to whether the operating environment is abnormal.

The network device 100 attempts to communicate with local devices (here, devices existing within the same LAN are referred to as local devices or simply devices). When successfully communicating with one or more of the local devices, the network device 100 acquires identification information pieces of the one or more local devices. The identification information pieces are, for example, MAC addresses (Media Access Control addresses). The network device 100 compares identification information pieces of local devices acquired at the most recent start-up, with identification information pieces of local devices acquired before the most recent start-up. In this way, the network device 100 specifies, as a difference, devices connected in the past but not connected at the most recent start-up. Then, the network device 100 judges whether to restrict access based on (i) the number of devices specified as a difference and (ii) index values each being used to estimate an existence probability of a corresponding device specified as a difference.

The network device 100 judges the current operating environment to be "abnormal" and restricts access to contents held therein when, during abnormality judgment, the index value of a device specified as a difference is larger than a threshold value and there is another device specified as a difference as well. In other words, the network device 100 judges the current operating environment to be "abnormal" and restricts access when the current operating environment is changed from the past operating environment to a degree that exceeds a predetermined reference limit. Here, the operating environment is a connection environment between the network device 100 and the local devices.

The abnormality judgment is performed with use of an index value for estimating the existence probability of a device. In this way, when, for example, a device having a low existence probability (e.g., a mobile device connected as needed) is not communicable at the most recent start-up, the network device 100 is prevented from judging the operating environment to be "abnormal" based on the reason that the device is not communicable.

<Structure>

In the following descriptions, a home server used at home is taken as an example of the network device 100. As shown in FIG. 1, a home server 100 is connected to one of the LAN ports of a router 120. Also, a recording/playback device 130, a printer 140, a display 150, and a mobile terminal 160 are connected to the remaining LAN ports of the router 120.

The home server 100, the printer 140, and the display 150 are connected to the router 120 via a wired network. The recording/playback device 130 and the mobile terminal 160 are connected to the router 120 via a wireless network. Each of the devices 120 to 160 has a MAC address as identification information. The address value of each MAC address is shown after each "[MAC address]" in FIG. 1. Although the home server 100 also has a MAC address, it is not shown in FIG. 1 since the MAC address of the home server 100 is irrelevant to the subject matter of the present invention.

The home server 100 communicates with the aforementioned devices within the LAN and also with the router 120 via the LAN, and distributes and accumulates various contents. Furthermore, the home server 100 regularly or irregularly attempts to establish communication with the devices within the LAN, records the history of communication together with the MAC address of each device, and performs abnormality judgment based on the history so as to judge whether to restrict access to the contents.

Figure 3:
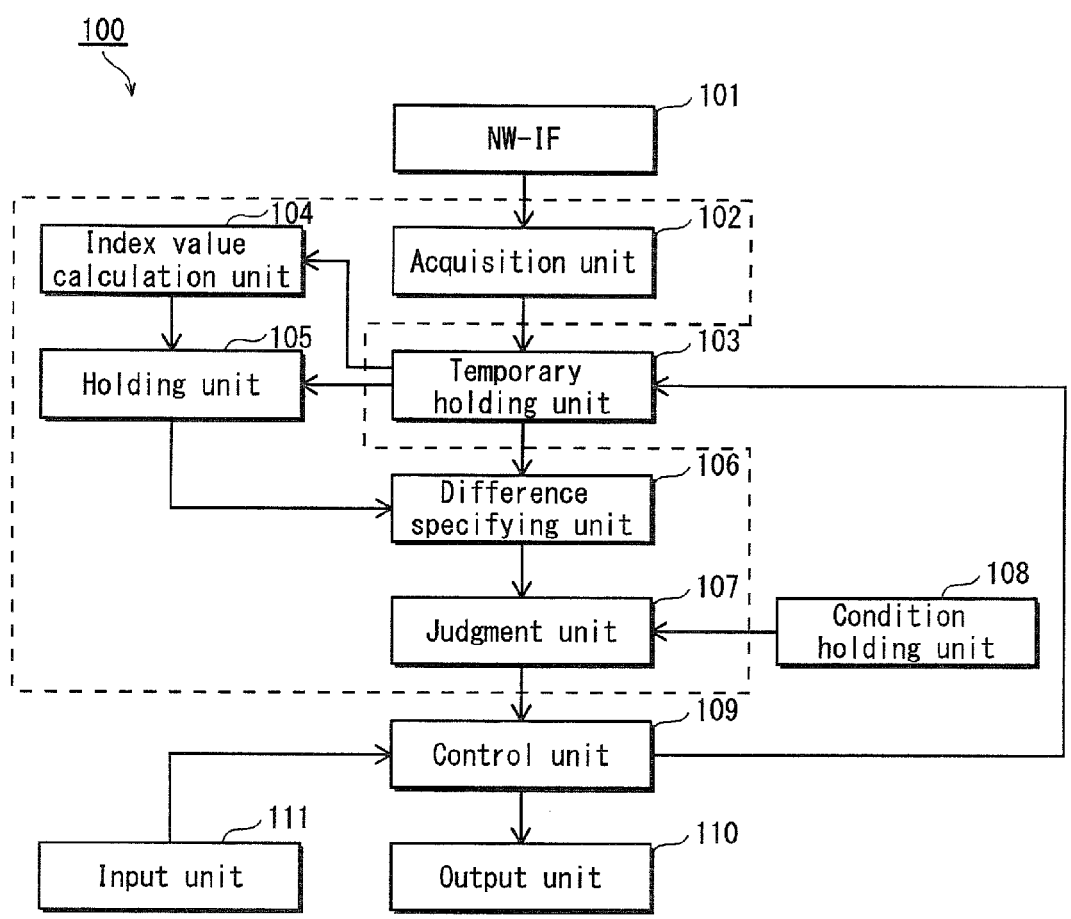
FIG. 3 is a block diagram of the network device 100.

FIG. 3 is a block diagram of the home server 100 that performs the processing described above.

The home server 100 includes a memory, a processor, a hard disk, a small LCD (Liquid Crystal Display), etc., which are not shown in figures.

As shown in FIG. 3, the home server 100 includes, as functional units, a network interface (NW-IF) 101, an acquisition unit 102, a temporary holding unit 103, an index value calculation unit 104, a holding unit 105, a difference specifying unit 106, a judgment unit 107, a condition holding unit 108, a control unit 109, an output unit 110, and an input unit 111. Note that the functions of the acquisition unit 102, the temporary holding unit 103, the index value calculation unit 104, the holding unit 105, the difference specifying unit 106, the judgment unit 107, and the control unit 109 are realized by the processor (not shown) executing a program stored in the memory (not shown).

The NW-IF 101 is a LAN card, and communicates with local devices such as a router and a printer.

The acquisition unit 102 attempts to communicate with local devices via the NW-IF 101. When successfully communicating with one of the local devices, the acquisition unit 102 acquires the MAC address of the local device as identification information thereof.

The temporary holding unit 103 includes a memory area for temporarily holding the MAC address acquired by the acquisition unit 102.

The index value calculation unit 104 calculates an index value for estimating the existence probability of the local device, based on the MAC address held in the temporary holding unit 103. Then, the index value calculation unit 104 updates local device information 20 (described below) held in the holding unit 105 with the calculated index value.

The holding unit 105 includes a flash memory, and holds the local device information 20 therein. The local device information 20 indicates, for each local device, a MAC address, an index value, etc. as one record. Also, in a case where a MAC address held in the temporary holding unit 103 has yet to be registered in the local device information 20, the holding unit 105 registers a record including the MAC address into the local device information 20.

The difference specifying unit 106 is partially involved in abnormality judgment. The difference specifying unit 106 compares MAC addresses included in present information 10 with MAC addresses registered in the local device information 20. Here, the present information 10 is held by the temporary holding unit 103, and the local device information 20 is held by the holding unit 105.

The judgment unit 107 is partially involved in abnormality judgment. The judgment unit 107 acquires, from the condition holding unit 108, a threshold value corresponding to an index value used for abnormality judgment, and performs abnormality judgment based on an existence probability 25 and a measurement count 24 that are indicated by the local device information 20, and that correspond to a device specified as a difference by the difference specifying unit 106. Specifically, the judgment unit 107 judges to be "abnormal" when there are a plurality of devices specified as a difference by the difference specifying unit 106, and an index value of at least one of the devices is larger than a corresponding threshold value.

The condition holding unit 108 is a part of the flash memory, and holds a threshold value corresponding to an index value used for abnormality judgment.

The input unit 111 receives authentication information input by a keyboard, a pointing device, etc.

Upon receiving a request for inputting authentication information from the control unit 109, the output unit 110 outputs a message indicating the request for inputting the authentication information to the small LCD or the like.

Also, the control unit 109 restricts the local devices from accessing contents held in network device 100, based on a result of the abnormality judgment performed by the judgment unit 107. Specifically, when a result of the abnormality judgment is "abnormal", the control unit 109 transmits the input request of authentication information to the output unit 110. Upon receiving authentication information input by a user via the input unit 111, the control unit 109 performs authentication processing based on the authentication information. When the authentication fails, the control unit 109 turns off the power of the network device 100. When the authentication is successful or the result of the abnormality judgment is "normal", i.e., the current operating environment is judged to be "normal", the control unit 109 transmits an instruction signal, which instructs update of the local device information 20 using the present information 10, to the temporary holding unit 103.

<Data>

FIG. 4A shows a data structure and details of the present information 10, which is used for abnormality judgment performed by the home server 100 having the aforementioned structure.

The present information 10 is identification information of each local device, namely the MAC addresses of the router 120, the recording/playback device 130, the printer 140, the display 150, and the mobile terminal 160. The present information 10 is acquired by the acquisition unit 102 at each start-up of the home server 100.

FIG. 4A shows the present information 10 including five records: the first record (at the top) corresponding to the MAC address of the router 120; the second record to the MAC address of the recording/playback device 130; the third record to MAC address of the printer 140; the fourth record to the MAC address of the display 150; and the fifth record to the MAC address of the mobile terminal 160.

FIG. 4B shows the present information 10 acquired when the home server 100 is started up in the operating environment shown in FIG. 2. In this case, the present information 10 includes three records: the first record corresponding to the MAC address of a router 170; the second record to the MAC address of a personal computer 180; and the third record corresponding to the MAC address of a scanner 190.

FIG. 5A shows a data structure and details of the local device information 20 used by the home server 100.

The local device information 20 includes records of local devices. Each record shows identification information 21, an existence count 22, a nonexistence count 23, the measurement count 24, and the existence probability 25 in association with each other. The local device information 20 is held in the flash memory of the holding unit 105.

Here, the identification information 21 is the MAC address of each local device. Assume here that the holding unit 105 has received the present information 10 from the temporary holding unit 103, and the present information 10 includes a MAC address not registered in the local device information 20. In this case, the MAC address is additionally registered to the local device information 20.

The existence count 22 indicates the number of times a local device existed in a communicable state over a time period from when the local device was initially registered to the current time point, when the acquisition unit 102 has attempted to communicate with the local device. If a MAC address registered in the local device information 20 is included in the present information 10, the existence count 22 corresponding to the MAC address is incremented by one.

The nonexistence count 23 indicates the number of times a local device did not exist in a communicable state over a time period from when the local device was initially registered to the current time point, when the acquisition unit 102 has attempted to communicate with the local device. If a MAC address registered in the local device information 20 is not included in the present information 10, the nonexistence count 23 corresponding to the MAC address is incremented by one.

The measurement count 24 indicates a value obtained by adding the existence count 22 and the nonexistence count 23.

The existence probability 25 indicates a value obtained by dividing the existence count 22 by the measurement count 24. The measurement count 24 is obtained by adding the existence count 22 and the nonexistence count 23. The existence probability 25 is used as an index value for estimating a ratio at which a local device exists in a state communicable with the home server 100.

<Operations>

Figure 6:
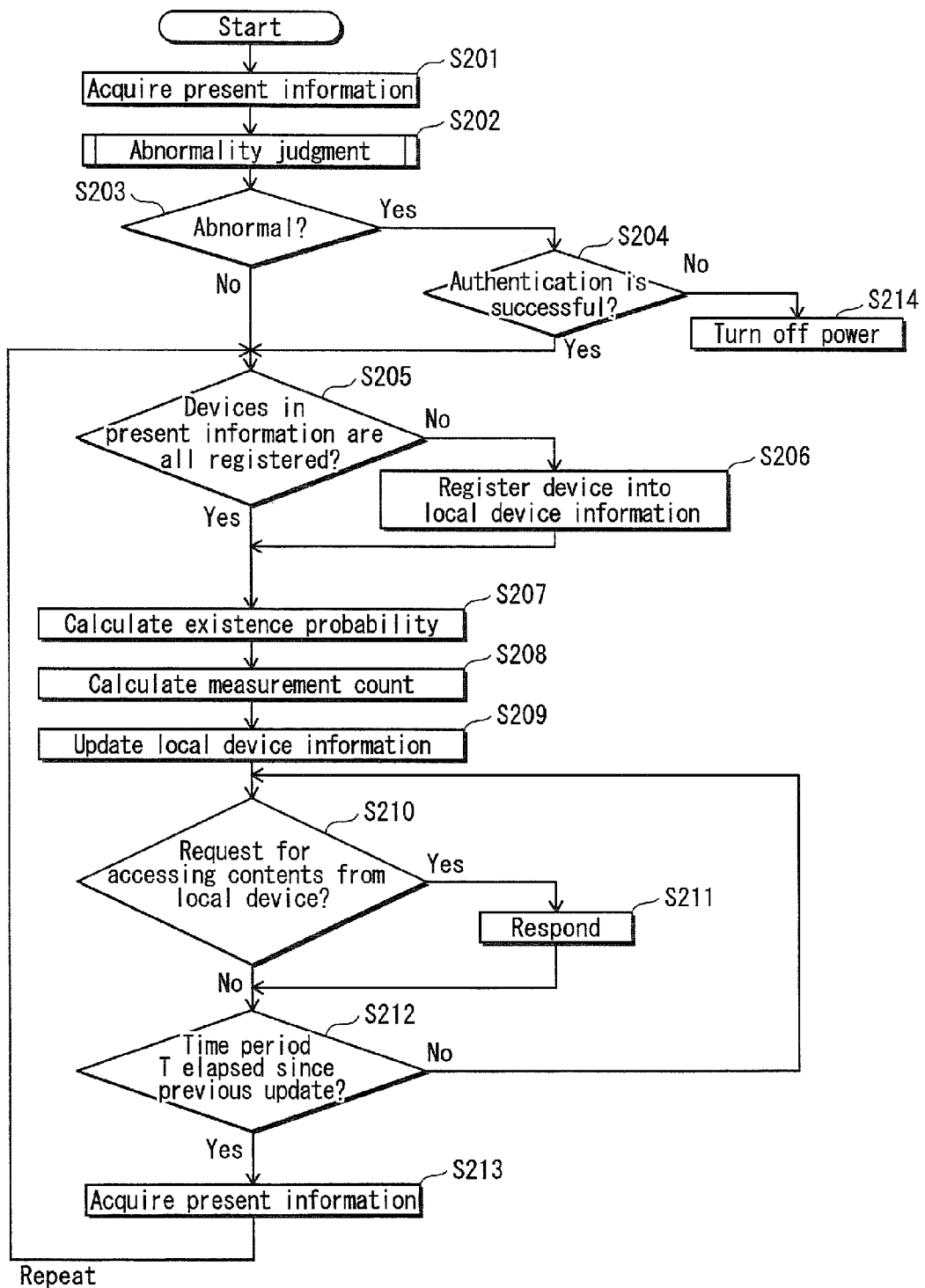
FIG. 6 is a flowchart showing operations of the network device 100.

FIG. 6 is a flowchart showing operations of the home server 100 according to Embodiment 1.

The following descriptions are provided based on the premise that the local device information 20 held in the holding unit 105 is in a state shown in FIG. 5A.

When the home server 100 is started up, namely when the home server 100 is switched on, the acquisition unit 102 communicates with local devices that are in a communicable state, and acquires the MAC addresses of the local devices (step 201). For example, the acquisition unit 102 makes an inquiry to a DHCP (Dynamic Host Configuration Protocol) server or the like and acquires a range of IP addresses (Internet Protocol Addresses) used within the same LAN. Then, the acquisition unit 102 broadcasts an ARP (Address Resolution Protocol) request using the range of IP addresses, receives a response signal to the ARP request, i.e., an RARP (Reverse Address Resolution Protocol), and thereby acquires the MAC addresses.

Subsequently, the acquisition unit 102 transmits the MAC addresses to the temporary holding unit 103. The temporary holding unit 103 holds the MAC addresses as the present information 10. While still holding the present information 10 therein, the temporary holding unit 103 transmits the present information 10 to the difference specifying unit 106. The present information 10 at this time is assumed to be the one shown in FIG. 4A.

The difference specifying unit 106 receives, from the holding unit 105, the local device information 20 which shows information on local devices pertaining to the past communications, and also receives the present information 10 from the temporary holding unit 103. Then, the difference specifying unit 106 specifies, as a difference, a device whose MAC address is registered in the local device information 20 but not included in the present information 10. The judgment unit 107 performs abnormality judgment so as to judge whether to restrict access, based on (i) the number of devices specified as a difference and (ii) index values for estimating an existence probability of each device specified as a difference (step S202). Details of the processing for abnormality judgment are described below.

When a result of the abnormality judgment is "abnormal" (Yes in step S203), the home server 100 restricts access by requesting a user to perform authentication (step S204).

For the authentication in step S204, the control unit 109 transmits a request for inputting authentication information to the output unit 110, and the output unit 110 outputs, on the small LCD, a message indicating the input request received from the control unit 109. Upon receiving the authentication information from the user, the input unit 111 transmits the authentication information to the control unit 109. When the authentication information matches preset authentication information that was set by the user in advance, the control unit 109 judges that the authentication is successful. When the authentication information does not match the preset authentication information, the control unit 109 judges that the authentication has failed.

When judging that the authentication has failed (No in step S204), the control unit 109 switches off the power of the home server 100, i.e., cuts off the power supply to the home server 100 (step S214).

When a result of the abnormality judgment is "normal" (No in step S203) or when the authentication is successful (Yes in step S204), the home server 100 repeats the processing of steps S205 to S213 while in operation.

When a result of the abnormality judgment is "normal" or when the authentication is successful, the control unit 109 transmits, to the temporary holding unit 103, an instruction signal instructing that the local device information 20 be updated based on the present information 10. Upon receiving the instruction signal, the temporary holding unit 103 transmits the present information 10 held therein to the index value calculation unit 104 and the holding unit 105.

Upon receiving the present information 10 from the temporary holding unit 103, the holding unit 105 judges whether the present information 10 includes any MAC address not registered in the local device information 20 held therein (step S205). When judging that the present information 10 includes an unregistered MAC address, the holding unit 105 additionally registers a record corresponding to the unregistered MAC address into the local device information 20 (step S206).

Here, the present information 10 includes the MAC address of the mobile terminal 160, i.e., 00:00:0C:06:AC:5D; however, the local device information 20 does not include the MAC address of the mobile terminal 160. Therefore, the holding unit 105 additionally registers a record corresponding to the MAC address of the mobile terminal 160, i.e., 00:00:0C:06:AC:5D, into the local device information 20 (see FIG. 5B).

The index value calculation unit 104 updates the local device information 20. Specifically, when the present information 10 received from the temporary holding unit 103 includes a MAC address already registered in the local device information 20, the index value calculation unit 104 increments the existence count 22 corresponding to the MAC address by one. When the present information does not include a MAC address already registered in the local device information 20, the index value calculation unit 104 increments the nonexistence count 23 corresponding to the MAC address by one. Also, the index value calculation unit 104 calculates the existence probability 25 by dividing the existence count 22 by a value obtained by adding the existence count 22 and the nonexistence count 23 (step S207), and calculates the measurement count 24 by adding the existence count 22 and the nonexistence count 23 (step S208). The index value calculation unit 104 updates the local device information 20 with the existence count 22, the nonexistence count 23, the measurement count 24, and the existence probability 25 that have been calculated (step S209).

Here, the MAC address 00:00:0C:07:AC:0B of the router 120, which is registered in the first record of the local device information 20, is included in the present information 10. Therefore, the existence count 22 corresponding to the MAC address 00:00:0C:07:AC:0B of the router 120 is incremented by one. As a result, the existence count 22 is calculated to be "100", the measurement count 24 is calculated to be "101", and the existence probability 25 is calculated to be 99%. The records in the local device information 20 that correspond to the recording/playback device 130, the printer 140, and the display 150 are also updated in the same manner (see FIG. 5B).

Also, when receiving a request for accessing contents from a local device (step S210), the home server 100 performs control for reading from/writing to the contents (step S211).

When a time period T has elapsed after the update of the local device information 20 (Yes in step S212), the acquisition unit 102 attempts to acquire the MAC addresses of local devices (step S213), and transmits an acquired MAC address to the temporary holding unit 103. Upon receiving the MAC address, the temporary holding unit 103 transmits the MAC address to the index value calculation unit 104 and the holding unit 105. The time period T is one hour, for example, and means that the processing of steps S205 to S213 is repeated every one hour.

As described above, the acquisition unit 102 attempts to acquire the MAC addresses by repeating the processing of steps S205 to S213 every hour, for example. When a MAC address has been successfully acquired as a result of the attempt, the existence count 22 corresponding to the MAC address is incremented by one. When a MAC address has not been acquired, the nonexistence count 23 corresponding to the MAC address is incremented by one. Accordingly, the measurement count 24 and the existence probability 25 are updated as well. This increases the probability of distinguishing a device always connected to the home server 100 from a device connected thereto as needed. In other words, the accuracy of the existence probability is increased.

The following describes details of the processing of abnormality judgment (step S202).

FIG. 7 is a flowchart of abnormality judgment.

The difference specifying unit 106 receives the local device information 20 from the holding unit 105, and also receives the present information 10 from the temporary holding unit 103. Then, in a case where there is a device whose MAC address is registered in the local device information 20 but not included in the present information 10, the difference specifying unit 106 specifies the device as a difference (step S301).

In a case where the local device information 20 (FIG. 5A) is compared with the present information 10 (FIG. 4A), all of the MAC addresses registered in the local device information 20 are included in the present information 10. Therefore, there is no device specified as a difference, and thus the operating environment is judged to be "normal" (step S309).

When there are one or more devices specified as a difference, the judgment unit 107 performs the following judgment by focusing on one of the one or more specified devices (step S302).

The judgment unit 107 judges whether the existence probability 25 of the device specified as a difference, which is used as an index value thereof, is higher than a threshold value of the existence probability 25 acquired from the condition holding unit 108 (step S303). When the existence probability 25 of the device specified as a difference is higher than the threshold value, the judgment unit 107 judges whether the measurement count 24 of the device specified as a difference is larger than a threshold value of the measurement count 24 acquired from the condition holding unit 108 (step S304). When the measurement count 24 of the device specified as a difference is larger than the threshold value, the judgment unit 107 judges whether there is any other device specified as a difference (step S305). When there is another device specified as a difference in step S305, the judgment unit 107 judges to be "abnormal" (step S308).

In a case where: the existence probability 25 of the device specified as a difference is lower than or equal to the threshold value thereof in step S303; or the measurement count 24 of the device is smaller than or equal to the threshold value thereof in step S304, the judgment unit 107 judges whether there is any other device specified as a difference but not focused on yet (step S306). When judging that there is another device specified as a difference but not focused on yet, the judgment unit 107 focuses on the device (step S307), and repeats the processing from the step S303 onwards.

The judgment unit 107 judges to be "normal" (step S309) in the following cases: there is no device specified as a difference in step S301; the existence probability 25 of a device specified as a difference and focused on last is lower than or equal to the threshold value thereof in step S303; the measurement count 24 of the device specified as a difference and focused on last is smaller than or equal to the threshold value thereof in step S304; and there is no other device specified as a difference in step S305, that is, a device specified as a difference is assumed to be temporarily disconnected due to malfunction, replacement, etc. or the power of the device specified as a difference is assumed to be switched off.

In other words, the judgment unit 107 judges to be "abnormal" when the current operating environment is changed from the past operating environment to a degree that exceeds a predetermined reference limit.

The following shows an example of abnormality judgment (see FIG. 7). In this example, the local device information 20 is assumed to be the one shown in FIG. 5A. Also, the threshold value of the existence probability 25 is assumed to be 80%, and the threshold value of the measurement count 24 is assumed to be 50.

Suppose that the present information 10 acquired at the most recent start-up is the one shown in FIG. 4B. In this case, MAC addresses not registered in the local device information 20 shown in FIG. 5A are acquired, but MAC addresses already registered therein are not acquired. The existence probability 25 of the router 120 registered in the first record of the local device information 20 is higher than the threshold value thereof (see step S303), and the measurement count 24 of the router 120 is larger than the threshold value thereof (see step S304). Also, there are other devices (e.g., the recording/playback device 130, etc.) than the router 120 that are registered in the local device information 20 but not included in the present information 10 (see step S305). Therefore, the judgment unit 107 judges that the operating environment is "abnormal".

Suppose that the present information 10 acquired at the most recent start-up is the one shown in FIG. 4C. In this case, one of the MAC addresses registered in the local device information 20 shown in FIG. 5A is not acquired. However, the existence probability 25 of a device corresponding to the unacquired MAC address is lower than the threshold value thereof (see step S303). Therefore, the judgment unit 107 judges that the operating environment is "normal".

Suppose that the present information 10 acquired at the most recent start-up is the one shown in FIG. 4D. In this case, one of the MAC addresses registered in the local device information 20 shown in FIG. 5A is not acquired. However, the measurement count 24 of a device corresponding to the unacquired MAC address is lower than the threshold value thereof (see step S304). Therefore, the judgment unit 107 judges that the operating environment is "normal".

Suppose that the present information 10 acquired at the most recent start-up is the one shown in FIG. 4E. In this case, one of the MAC addresses registered in the local device information 20 shown in FIG. 5A is not acquired, but all the other MAC addresses registered therein are acquired (see step S305). Therefore, the judgment unit 107 judges that the operating environment is "normal".

Embodiment 2

The following describes Embodiment 2 of the present invention. Embodiment 2 is different from Embodiment 1 with respect to a calculation method in which the home server 100 calculates an index value for estimating the existence probability. Specifically, in Embodiment 1, the existence probability 25 is used as an index value; whereas in Embodiment 2, a communication time ratio is used as an index value. The communication time ratio is a value obtained by dividing an accumulated communication time between the home server 100 and a local device by a total of the accumulated communication time of every local device registered in local device information 30 (described below).

<Structure>

In Embodiment 2, a hardware structure and a functional structure are the same as those in the home server 100 in Embodiment 1. The index value calculation unit 104 is partially modified so as to realize (i) measurement of communication time between the home server 100 and a local device and (ii) calculation of the communication time ratio.

When the home server 100 has communicated with a local device, the index value calculation unit 104 measures the communication time with the local device, and updates communication time 32 corresponding to the local device in the local device information 30. Also, the index value calculation unit 104 calculates a communication time ratio 33 by dividing communication time 32 of the local device by a total of the accumulated communication time of every local device registered in local device information 30.

<Data>

The following describes the local device information 30 used for abnormality judgment.

FIG. 8A shows a data structure and details of the local device information 30 used by the home server 100.

The local device information 30 indicates, for each local device, a record which consists of the identification information 31, the communication time 32, and the communication time ratio 33. The local device information 30 is held in the holding unit 105.

Here, the identification information 31 is the MAC address of each local device. Suppose that the holding unit 105 has received the present information 10 from the temporary holding unit 103, and the present information 10 includes a MAC address not registered in the local device information 30. In this case, a record corresponding to the MAC address is additionally registered into the local device information 30. Also, suppose that the home server 100 has communicated with a local device in response to a request for accessing contents, and the MAC address of the local device is not registered in the local device information 30. In this case, a record corresponding to the MAC address is also additionally registered into the local device information 30.

The communication time 32 indicates accumulated communication time between a local device and the home server 100. In a case where the home server 100 has communicated with a local device, the index value calculation unit 104 measures communication time between the home server 100 and the local device, and adds the communication time to the communication time 32 corresponding to the identification information 31 of the local device.

Also, the communication time ratio 33 indicates a value obtained by dividing the communication time 32 of a local device by a total of the accumulated communication time 32 of every local device registered in the local device information 30. The communication time ratio 33 is used as an index value for estimating the existence probability of a local device.

The local device information 30 is updated every time the home server 100 communicates with a local device in response to a request for accessing contents.

<Operations>

Figure 9:
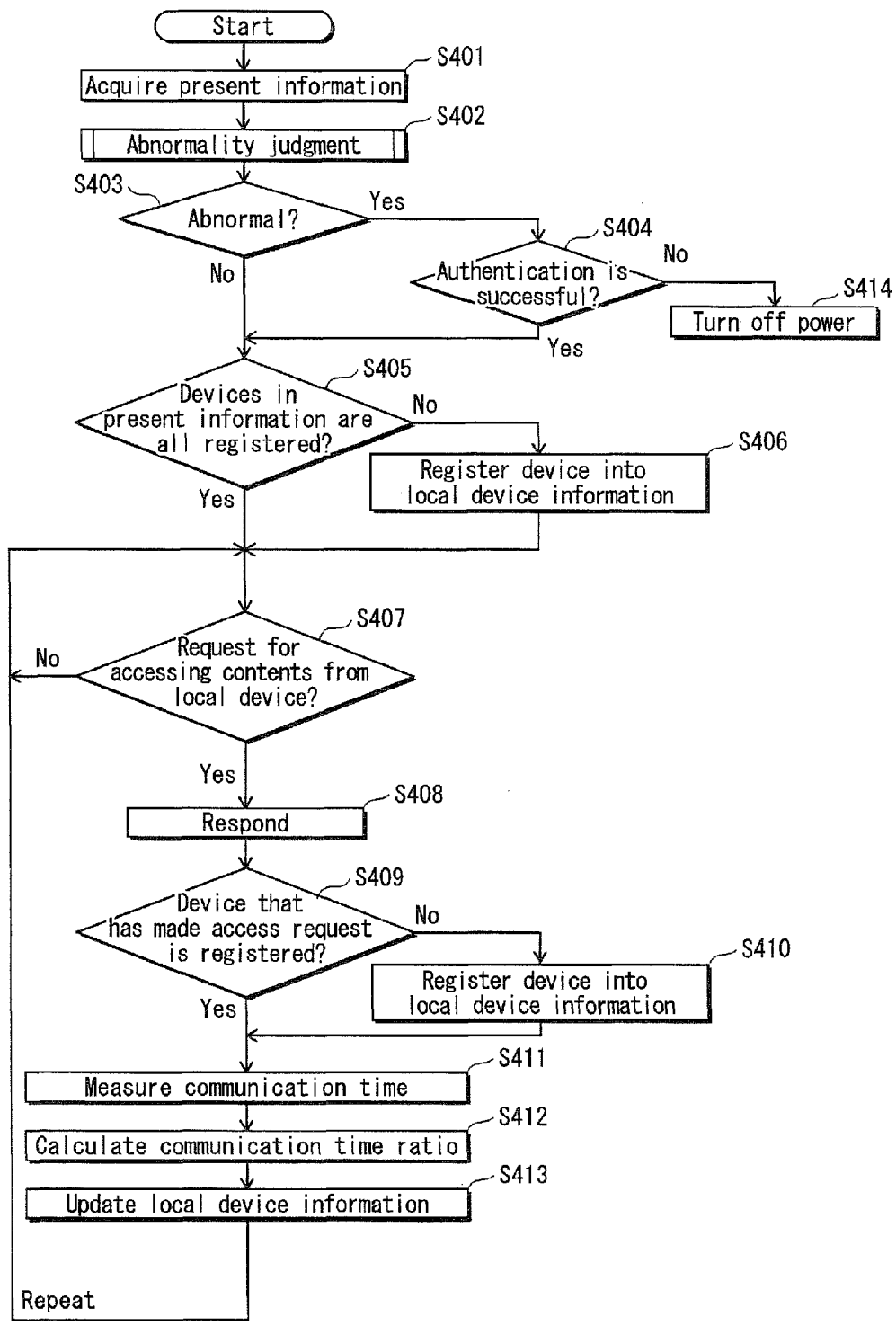
FIG. 9 is a flowchart showing operations of the network device 100.

FIG. 9 is a flowchart showing operations of the home server 100 according to Embodiment 2.

Upon start-up, the home server 100 acquires one or more MAC addresses of one or more local devices, and performs abnormality judgment based on the one or more MAC addresses and the local device information 30 held in the holding unit 105. When a result of the abnormality judgment is "abnormal", the home server 100 requests a user to perform authentication. When the authentication fails, the home server 100 switches off its own power. Suppose that a result of the abnormality judgment is "normal" or that the authentication is successful. In this case, if the present information 10 includes a MAC address not registered in the local device information 30, the home server 100 additionally registers a record corresponding to the MAC address into the local device information 30 (steps S401 to S406, and step S414).

The processing of the aforementioned steps S401 to S406 and step S414 is the same as the processing of steps S201 to S206 and step S214 which is described above with reference to FIG. 6. Note that details of the abnormality judgment (step S402), which are described below, are different from the abnormality judgment in step S202.

When a result of the abnormality judgment is "normal" (No in step S403) or when the authentication is successful (Yes in step S404), the home server 100 repeats the processing of steps S407 to S413.

Upon receiving a request for accessing contents from a local device (step S407), the home server 100 performs control for reading from/writing to the contents (step S408). The index value calculation unit 104 judges whether the MAC address of a local device with which the home server 100 is communicating is registered in the local device information 30 (step S409), and measures communication time with the local device (step S411). When the MAC address of the local device with which the home server 100 is communicating is not registered in the local device information 30 (step S409), the home server 100 registers a record corresponding to the unregistered MAC address into the local device information 30 (step S410).

The index value calculation unit 104 divides, for each local device, the communication time 32 of the local device by a total of the communication time 32 of every local device registered in the local device information 30, calculates the communication time ratio 33 of the local device (step S412), and updates local device information 30 (step S413).

In the present embodiment, the local device information 30 is assumed to be the one shown in FIG. 8A. Suppose that the MAC address of a local device that has requested for accessing contents and with which the home server 100 is communicating is 00:00:0C:06:BC:1D, and that the communication time measured by the index value calculation unit 104 is 20 seconds. In this case, the index value calculation unit 104 adds 20 seconds to the communication time 32 corresponding to the MAC address 00:00:0C:06:BC:1D, so as to calculate that the communication time is 70 seconds. Also, the index value calculation unit 104 divides the communication time 32 corresponding to the MAC address 00:00:0C:06:BC:1D by a total (100+70+40+10) of the communication time 32 of every local device registered in the local device information 30, so as to calculate that the communication time ratio 33 is 32%. Similarly, the index value calculation unit 104 calculates the communication time ratio 33 of each local device registered in the local device information 30 (see FIG. 8B).

The home server 100 repeats the processing of steps S407 to S413, and estimates the existence probability of each local device from the communication time ratio 33 thereof. This makes it possible to restrict access in accordance with a usage pattern.

The following describes details of the processing of abnormality judgment (step S402).

Figure 10:
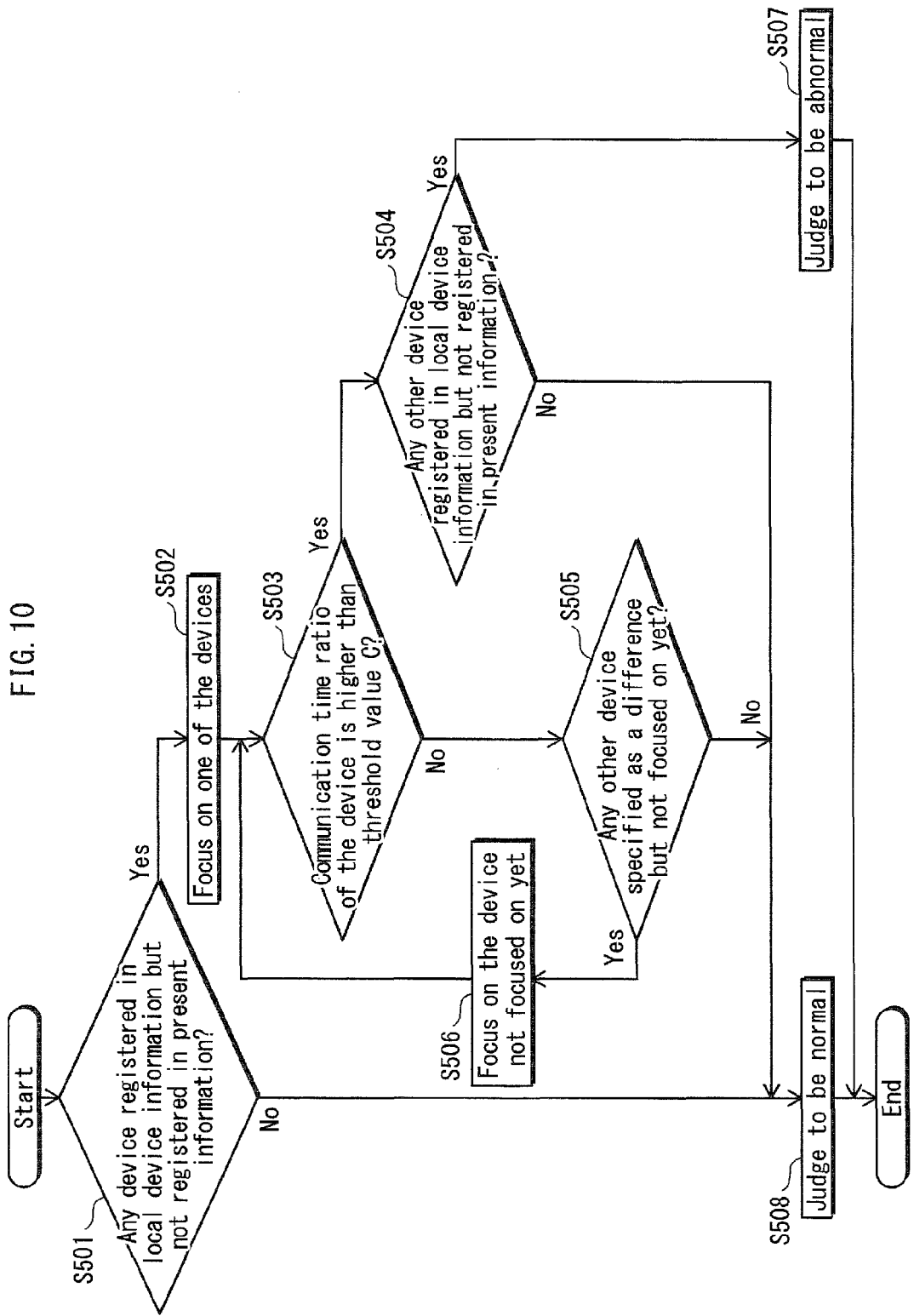
FIG. 10 is a flowchart of abnormality judgment.

FIG. 10 is a flowchart of abnormality judgment.

The difference specifying unit 106 receives the local device information 30 from the holding unit 105, and also receives the present information 10 from the temporary holding unit 103. Then, in a case where there is a device whose MAC address is registered in the local device information 30 but not included in the present information 10, the difference specifying unit 106 specifies the device as a difference (step S501). When there are one or more devices specified as a difference, the judgment unit 107 performs the following judgment by focusing on one of the one or more devices specified as a difference (step S502).

The judgment unit 107 judges whether the communication time ratio 33 of the device specified as a difference is higher than a threshold value acquired from the condition holding unit 108 (step S503). When the communication time ratio 33 of the device specified as a difference is higher than the threshold value, the judgment unit 107 judges whether there is any other device specified as a difference (step S504). When there is another device specified as a difference in step S504, the difference specifying unit 106 judges to be "abnormal" (step S507).

In a case where the communication time ratio 33 of the device specified as a difference is lower than or equal to the threshold value thereof in step S503, the judgment unit 107 judges whether there is any other device specified as a difference but not focused on yet (step S505). When judging that there is another device specified as a difference but not focused on yet, the judgment unit 107 focuses on the device (step S506), and repeats the processing from the step S503 onwards.

The judgment unit 107 judges to be "normal" (step S508) in the following cases: there is no device specified as a difference in step S501; the communication time ratio 33 of a device specified as a difference and focused on last is lower than or equal to the threshold value thereof in step S503; and there is no other device specified as a difference in step S504, that is, a device specified as a difference is assumed to be temporarily disconnected due to malfunction, replacement, etc. or when the power of the device specified as a difference is assumed to be switched off.

The following shows an example of abnormality judgment (see FIG. 10). In the present embodiment, the local device information 30 is assumed to be the one shown in FIG. 8A, and the threshold value of the communication time ratio 33 is assumed to be 25%.

Suppose that the present information 10 acquired at the most recent start-up is the one shown in FIG. 4B. In this case, MAC addresses not registered in the local device information 30 shown in FIG. 8A are acquired, but MAC addresses already registered therein are not acquired. The communication time ratio 33 of the router 120 registered in the first record of the local device information 30 is higher than the threshold value thereof (see step S503), and there are other devices (e.g., the recording/playback device 130, etc.) than the router 120 that are registered in the local device information 30 but not included in the present information 10 (see step S504). Therefore, the judgment unit 107 judges that the operating environment is "abnormal".

Suppose that the present information 10 acquired at the most recent start-up is the one shown in FIG. 4C. In this case, one of the MAC addresses registered in the local device information 30 shown in FIG. 8A is not acquired. However, the communication time ratio 33 of a device corresponding to the unacquired MAC address is lower than the threshold value thereof (see step S503). Therefore, the judgment unit 107 judges that the operating environment is "normal".

Embodiment 3

The following describes a home server 600, which basically has the same structure as the home server 100 in Embodiment 1, except that the home server 600 includes a function for performing abnormality determination based on a host name corresponding to its own global IP address.

<Structure>

The following describes the home server 600.

Figure 11:
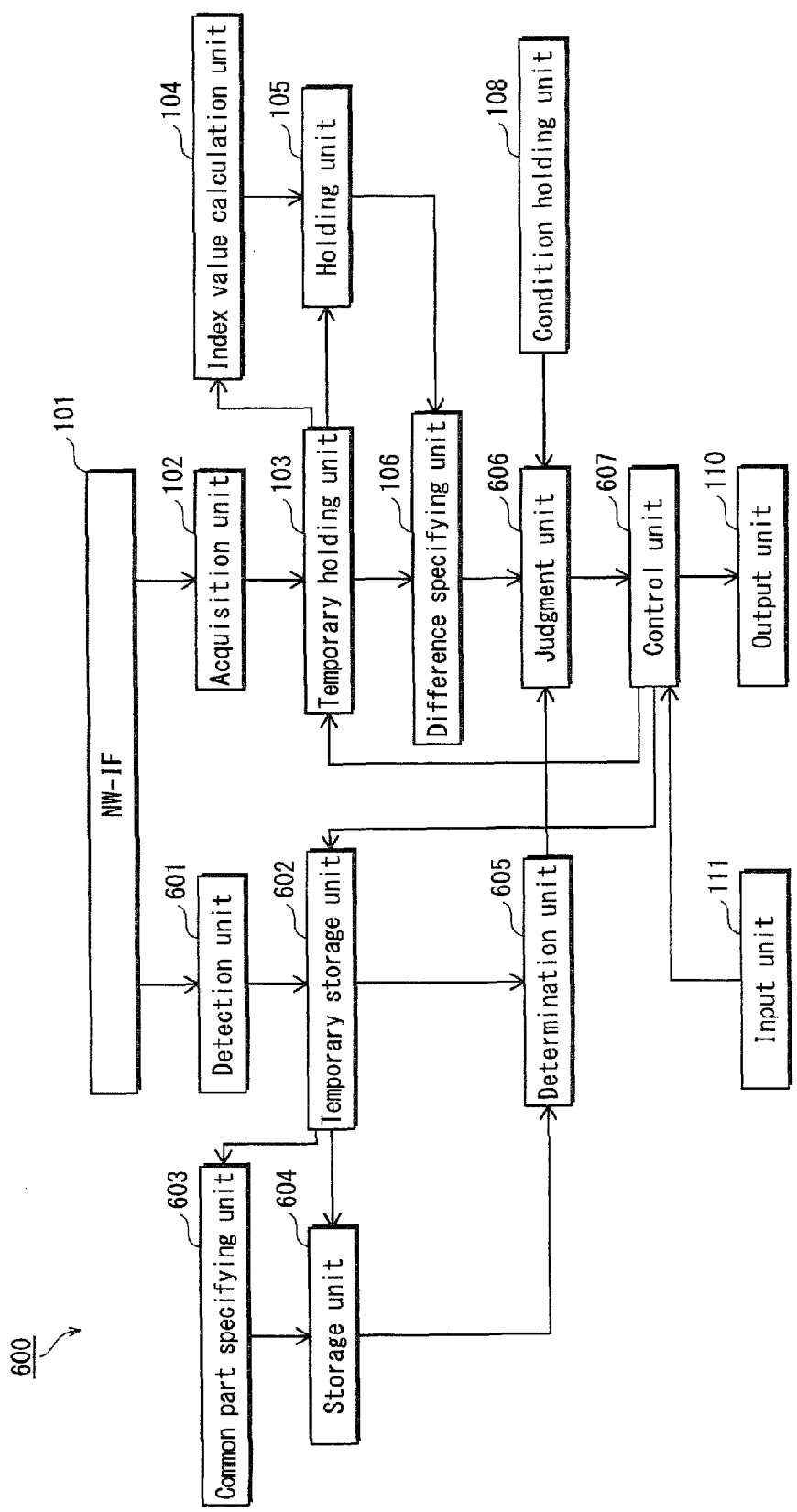
FIG. 11 is a block diagram of a network device 600 according to Embodiment 3.

FIG. 11 is a block diagram of the home server 600.

In Embodiment 3, a hardware structure of the home server 600 is the same as that in Embodiment 1.

As shown in FIG. 11, the home server 600 includes a detection unit 601, a temporary storage unit 602, a common part specifying unit 603, a storage unit 604, a determination unit 605, a judgment unit 606, and a control unit 607, in addition to the network interface (NW-IF) 101, the acquisition unit 102, the temporary holding unit 103, the index value calculation unit 104, the holding unit 105, the difference specifying unit 106, the condition holding unit 108, the output unit 110, and the input unit 111, which are the same as those in the home server 100 (see FIG. 3) in Embodiment 1. Note that the functions of the detection unit 601, the temporary storage unit 602, the common part specifying unit 603, the storage unit 604, the determination unit 605, the judgment unit 606, and the control unit 607 are realized by a processor (not shown) executing a program stored in a memory (not shown).

Here, the detection unit 601 detects a host name based on the global IP address of the home server 600.

The temporary storage unit 602 temporarily stores the host name detected by the detection unit 601.

The common part specifying unit 603 specifies a part common to host names that are registered in a host name log 41 (described below) stored in the storage unit 604.

The storage unit 604 includes a flash memory, and stores host name information 40 therein. The host name information 40 shows the host name log 41 and a common part 42. The host name information 40 indicates a plurality of host names that have been detected by the temporary storage unit 602 so far. The common part 42 is a part common to the plurality of host names, and is specified by the common part specifying unit 603.

The determination unit 605 determines whether the operating environment is abnormal, based on the host name stored in the temporary storage unit 602 and the host name information 40 stored in the storage unit 604. Specifically, the determination unit 605 determines to be "abnormal" when the following two conditions are satisfied: the host name log 41 in the host name information 40 stored in the storage unit 604 does not include a host name that matches the host name stored in the temporary storage unit 602; and the common name 42 in the host name information 40 does not match a corresponding part of the host name stored in the temporary storage unit 602, the corresponding part being a part corresponding to the common part 42. In other words, the determination unit 605 determines whether an ISP (Internet Service Provider) of the home server 600 is changed or not. The ISP connects, to the Internet, a LAN to which the home server 600 is connected.

The judgment unit 606 has a function of transmitting a result of the abnormality determination to the control unit 607, in addition to the functions of the judgment unit 107 described in Embodiment 1.

The control unit 607 has a function of restricting the local devices from accessing contents held in the home server 600, based on a result of the abnormality determination by the determination unit 605, in addition to the functions of the control unit 109 described in Embodiment 1.

<Data>

The following describes the host name information 40 used for abnormality determination performed by the home server 600 having the aforementioned structure.

FIG. 12A shows a data structure and details of the host name information 40 used by the home server 600.

The host name information 40 includes the host name log 41 and the common part 42, and is stored in the storage unit 604. The host name information 40 is used by the determination unit 605 for abnormality determination.

The host name log 41 indicates a plurality of host names detected so far. If the common part 42 (described below) of any of the host names is specified, the host name including the common part 42 is deleted from the host name log 41.

The common part 42 is a part common to some host names in the host name log 41, and is specified by the common part specifying unit 603 based on a predetermined criterion. Suppose that among the host names registered in the host name log 41, three or more host names have at least 10 common letters starting from the end of each host name. In this case, the common part specifying unit 603 specifies the part constituted by the at least 10 common letters as the common part 42. In FIG. 12A, three host names in the host name log 41 include ".tokyo.panasonic.com", which is common to each other. In this case, "*.tokyo.panasonic.com" is registered as the common part 42. Then, the host names whose common part 42 is specified, i.e., "1.tokyo.panasonic.com", "3.tokyo.panasonic.com", and "5.tokyo.panasonic.com", are deleted from the host name log 41 (see FIG. 12B).

<Operations>

Figure 13:
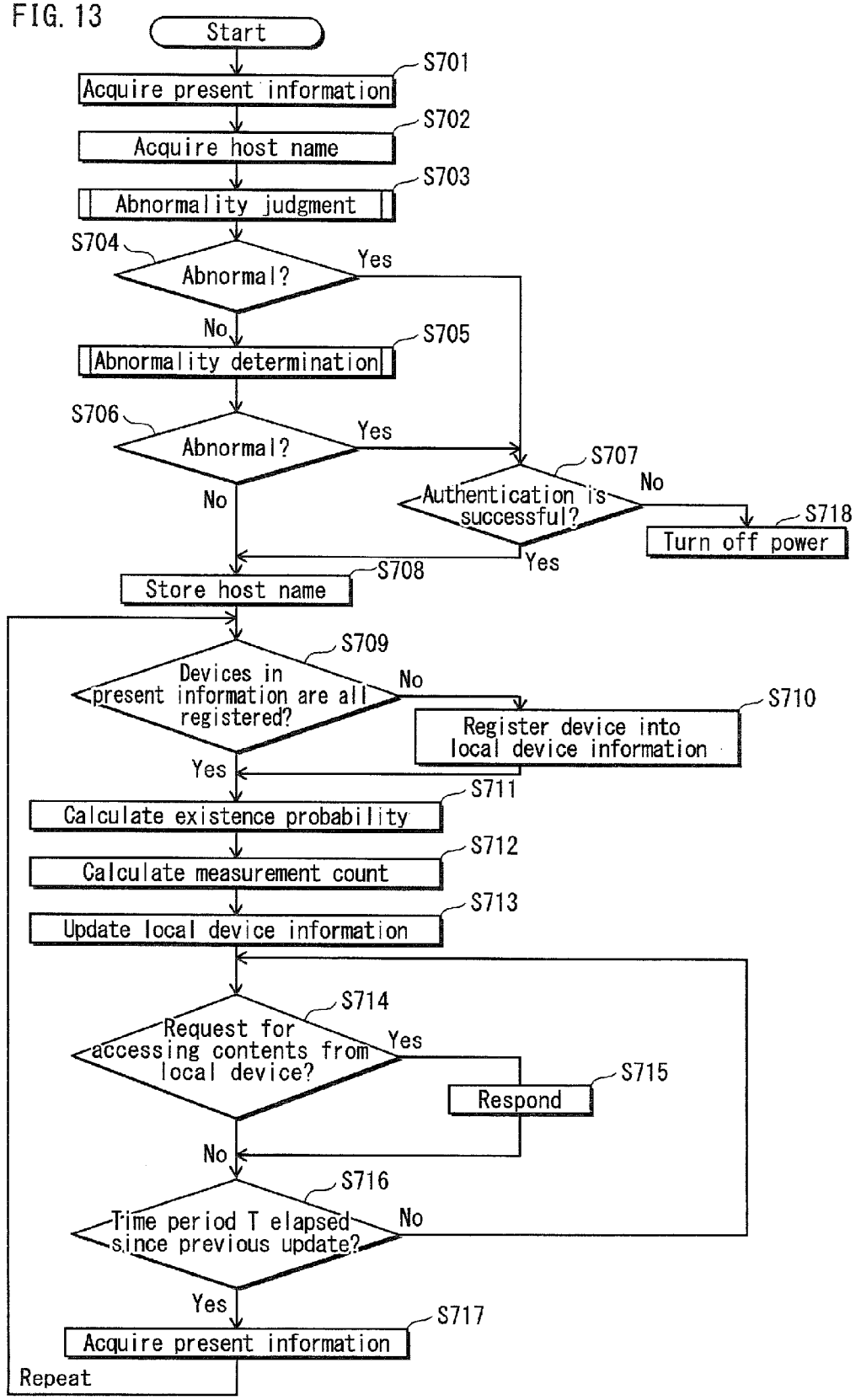
FIG. 13 is a flowchart showing operations of the network device 600.

FIG. 13 is a flowchart showing the operations of the home server 600.

When the home server 600 is started up, the acquisition unit 102 communicates with local devices that are in a communicable state, and acquires the MAC addresses of the local devices (step 701).

After acquiring the MAC addresses, the detection unit 601 makes an inquiry to a DNS (Domain Name System) server, and detects a host name corresponding to a global IP address of the home server 600 (step S702).

The home server 600 performs abnormality judgment based on the MAC addresses acquired in step S701 and the local device information 20 held in the holding unit 105. When a result of the abnormality judgment is "abnormal", the home server 600 requests a user to perform authentication. When the user authentication fails, the home server 600 switches off its power (steps S703, S704, S707, and S718).

The processing of the aforementioned steps S701, S703, S704, S707, and S718 is the same as the processing of steps S201, S202, S203, S204, and S214 described above with reference to FIG. 6.

When a result of the abnormality judgment by the judgment unit 606 is "normal", the determination unit 605 performs abnormality determination described below (step S705).

When a result of the abnormality determination is "normal" (No in step S706) or when the user authentication is successful (Yes in step S707), the control unit 607 transmits an instruction signal to the temporary storage unit 602. Upon receiving the instruction signal, the temporary storage unit 602 transmits the host name stored therein to the storage unit 604. The storage unit 604 receives the host name and, if a part of the host name that corresponds to the common part 42 does not match the common part 42, registers the host name into the host name log 41 stored therein (step S708). The common part specifying unit 603 specifies a part common to host names that are registered in the host name log 41. Specifically, suppose that more than a predetermined number of host names in the host name log 41 have at least predetermined number of common letters starting from the end of each host name, e.g., three or more host names have at least 10 common letters starting from the end of each host name. In this case, the common part specifying unit 603 specifies the part constituted by the at least 10 common letters as the common part 42. After specifying the common part 42, the common part specifying unit 603 deletes, from the host name log 41, the host names whose common part 42 has been specified.

After storing the host name in step S708, the home server 600 repeats the processing of steps S709 to S717 while in operation.

After storing the host name, the home server 600 additionally registers, based on the present information 10, a MAC address of a local device not registered in the local device information 20, and updates the local device information 20 (steps S709 to S713). Also, when receiving a request for accessing contents from a local device (Yes in step S714), the home server 600 performs control for reading from/writing to the contents (step S715). When a time period T has elapsed after the update of the local device information 20 (Yes in step S716), the acquisition unit 102 attempts to acquire the MAC addresses of local devices (step S717), and additionally registers a MAC address not registered in the local device information 20, and updates the local device information 20.

The processing of the aforementioned steps S709 to S717 is the same as the processing of steps S205 to S213 described above with reference to FIG. 6.

The following describes details of the processing of abnormality determination.

Figure 14:
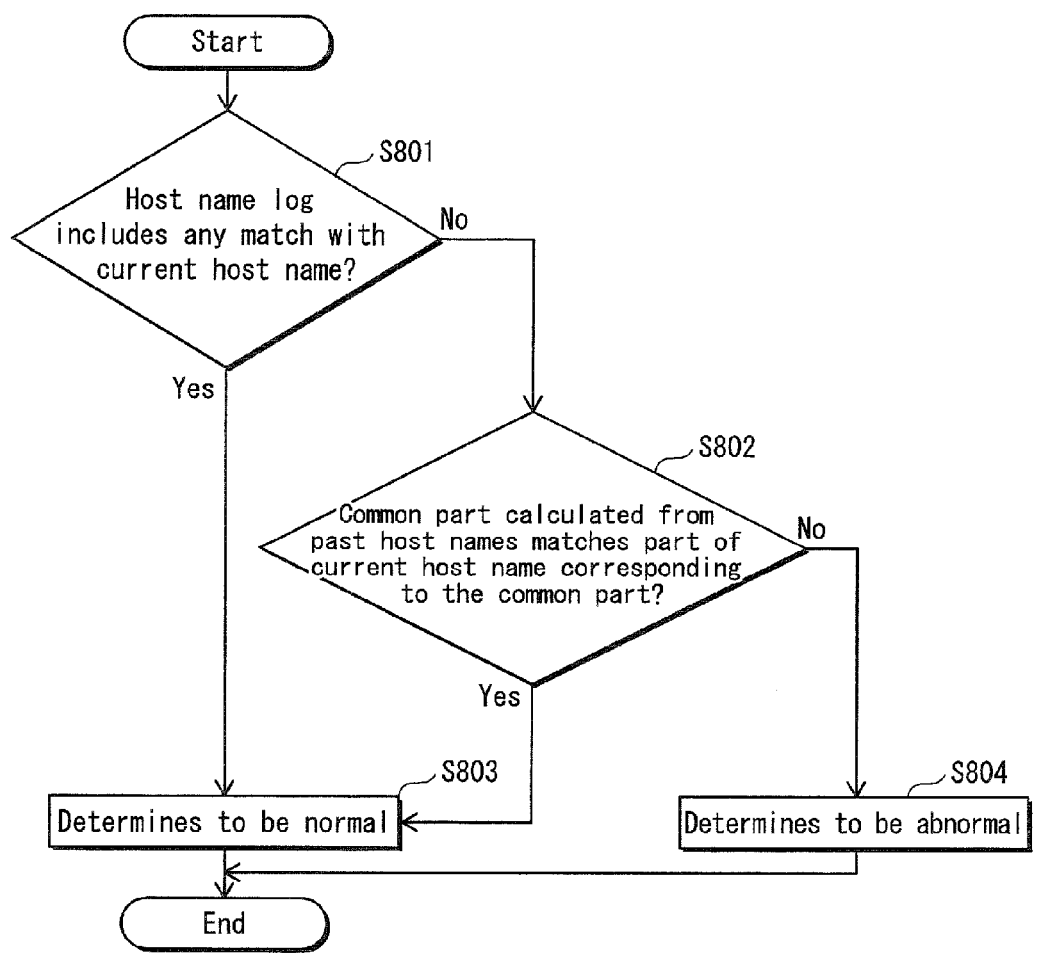
FIG. 14 is a flowchart of abnormality determination.

FIG. 14 is a flowchart of abnormality determination.

The determination unit 605 determines whether the host name log 41 of the host name information 40 includes a host name that matches the host name currently detected (step S801). When the host name log 41 does not include any host name that matches the host name currently detected, the determination unit 605 determines whether the common part 42 matches a part of the host name currently detected, the part corresponding to the common part 42 (step S802). When the common part 42 does not match the corresponding part of the host name currently detected, the determination unit 605 determines to be "abnormal" (step S804).

The determination unit 605 determines to be "normal" in the following two cases (step S803): the host name log 41 includes a host name that matches the host name currently detected in step S801; and the common part 42 matches the corresponding part of the host name currently detected in step S802.

Suppose that the host name information 40 is the one shown in FIG. 12B, and that a host name acquired at the most recent start-up is "4.tokyo.panasonic.com". In this case, the host name log 41 does not include a host name that matches "4.tokyo.panasonic.com" (see step S801), but a part of "4.tokyo.panasonic.com" matches "*.tokyo.panasonic.com" in the common part 42. Therefore, the determination unit 605 determines to be "normal" (see step S802).

As described above, the home server 600 performs abnormality determination based on a host name corresponding to its own global IP address, thereby checking whether the ISP thereof is changed. The home server 600 performs abnormality judgment based on the local device information 20, and performs abnormality determination based on the host name information 40. In general, an ISP is not frequently changed; therefore, if an ISP is changed, it is assumed that there is a possibility of theft. This enables contents to be protected more reliably.

<Supplementary Remarks>

The network device according to the present invention has been described in Embodiments 1, 2, and 3, by taking the home server as an example. However, the home server, i.e., the network device can be modified as follows, and the present invention is not limited to the network device described in the above embodiments.

(1) The index value is not limited to those described in the above embodiments, and may be modified appropriately as long as the existence probability of a local device can be estimated. For example, the index value may be determined based on the type of a local device. It is considered that a mobile device or the like is connected to the network device only when it is necessary, and is not always connected thereto. Also, it is considered that a router or the like is always connected to the network device, and is not replaced frequently in general. Therefore, the existence probability can be estimated based on the type of a local device. FIG. 15A shows a data structure and details of local device information 50 in a case where the index value is determined based on the type of a local device. FIG. 15B shows a data structure and details of a device index value table 60. The local device information 50 indicates, for each local device, identification information 51 and a type 52 in association with each other. The device index value table 60 indicates a type 61 and an index value 62 in association with each other. The acquisition unit 102 acquires the type 52 of each local device by means of a communication in compliance with a DLNA (Digital Living Network Alliance) guideline or the like. For example, the abnormality judgment by the judgment unit 107 may be performed based on the index value 62 corresponding to the type 61 of a device specified as a difference by the difference specifying unit 106. The type 61 of a device in the device index value table 60 matches the type 52 thereof in the local device information 50. Suppose that the MAC address of a device specified as a difference is 00:00:0C:07:AC:0B. In this case, the type 52 corresponding to the MAC address 00:00:0C:07:AC:0B is a router, and the index value corresponding to the router is "A" according to the device index value table 60. In this case, provided that the threshold value is "A" and the magnitudes of the threshold values are such that A>B>C. Then, if the router has been specified as a difference, and a device other than the router has been specified as a difference as well, the judgment unit 107 judges to be abnormal. Suppose that the threshold value is "A", and the index value of a device specified as a difference is "B". In this case, the index value of the device specified as a difference is smaller than the threshold value. Therefore, the judgment unit 107 does not judge to be "abnormal" just because the device does not exist in a communicable state.

(2) Regarding the local device information in the above embodiments, only recent data that corresponds to a predetermined time period before the current time point may be used at the time of abnormality judgment. For example, it is possible to use data over the last 2 weeks. In this case, the following procedures are necessary in Embodiment 1. That is, the network device 100 holds date information in addition to the local device information 20. The date information indicates, for each local device registered in the local device information 20, identification information, a present information acquisition date, an existence count, and a nonexistence count, in association with each other. When a present information acquisition date no longer falls within the time period from the last 2 weeks to the current time point, the network device 100 performs processing for subtracting the existence count and the nonexistence count that have been counted on the present information acquisition date, from the existence count 22 and the nonexistence count 23 in the local device information 20.

This makes it possible to calculate an index value according to the recent usage pattern, achieving the following advantageous effect. Suppose that there is a device that has not been connected to the network device for the last 2 weeks due to replacement or the like, but was connected thereto all the time before. In this case, the judgment unit 107 is prevented from judging to be "abnormal" just because the device does not exist in the same LAN when the network device 100 is started up.

Also, suppose that the measurement count 24 of a local device in the local device information 20 satisfies a predetermined condition. In this case, the record corresponding to the local device in the local device information 20 may not be updated any longer. For example, in a case where the predetermined condition is that the measurement count reaches 100 times, the router 120 and the recording/playback device 130 in the local device information 20 shown in FIG. 5A both satisfy the predetermined condition. Therefore, in the local device information 20, (i) the record corresponding to the MAC address of the router 120 and (ii) the record corresponding to the MAC address of the recording/playback device 130 are not updated any longer.

(3) In the above embodiments, the network device holds contents without encrypting the contents. However, the network device may encrypt and hold the contents. Also, the network device may include a function unit that is tamper-resistant and executes a decryption algorithm. Upon receiving an access request, the function unit may decrypt the encrypted contents in response to the access request. As a result, if the network device is switched off due to access restriction, the encrypted contents held therein cannot be decrypted. This makes it possible to protect the contents more reliably.

(4) In the above embodiments, the network device switches off its own power as access restriction. However, it is not limited to such. For example, the network device may not respond to an access request so as to prohibit rewriting and copying of contents. Alternatively, the network device may delete the contents held therein.

(5) In the above embodiments, the network device makes two different judgments, namely a judgment of performing access restriction and a judgment of not performing the access restriction. However, the condition holding unit 108 may include a plurality of threshold values so as to restrict the functions of the network device according to each threshold value. For example, a threshold value 1 may be set to 80% and a threshold value 2 to 50%. Then, the access restriction corresponding to the threshold value 1 may be the deletion of contents, and the threshold value 2 may be the prohibition against the copying of contents. Suppose, in this case, that the judgment unit 107 judges to be "abnormal", and local devices specified as a difference include a local device whose index value is 90%. This index value, 90%, exceeds the threshold value 1. Therefore, the network device deletes the contents held therein. Also, suppose that the judgment unit 107 judges to be "abnormal", and local devices specified as a difference include a local device whose index value does not exceed the threshold value 1 but exceeds the threshold value 2, such as a local device whose index value is 65%. In this case, the network device prohibits copying of the contents.

(6) In the above embodiments, when a judgment is made as "abnormal" in the abnormality judgment, the network device performs authentication processing. When the authentication processing is completed successfully, the network device does not delete the record of the local device information that corresponds to a device specified as a difference at the time of the abnormality judgment. However, it is not limited to such. The network device may delete the record corresponding to the device specified as a difference if the authentication processing is completed successfully.

(7) In the above embodiments, the network device acquires the MAC address of a local device as identification information with use of the ARP. However, the identification information may be information other than a MAC address as long as the information uniquely identifies a local device, such as a name provided by a user to the local device. Also, the acquisition method does not always need to be the method using the ARP. For example, it is possible to employ a protocol capable of acquiring the identification information of each local device.

(8) In the above embodiments, the local device information and the threshold values are stored in a flash memory. However, the local device information and the threshold values do not always need to be stored in a nonvolatile memory such as the flash memory, but may be stored on a recording medium such as a hard disk.

(9) In Embodiment 1 described above, the processing of steps S205 to S213 is repeated so as to increase the accuracy of the existence probability. However, it is possible to repeat only the processing of steps S210 to S211 and to not repeat the processing of steps S212 to S213, so as to reduce the processing load.

(10) In Embodiments 1 and 2 described above, the network device judges to be "abnormal" when there are a plurality of devices specified as a difference, and an index value of at least one of the devices is larger than a corresponding threshold value. However, a user may freely set the following: the number of local devices specified as a difference; the number of local devices whose index value exceeds a threshold value, among the local devices specified as a difference; and the magnitude of each threshold value. Then, in a case where there are three or more local devices specified as a difference, and the index values of at least two of the local devices are larger than the corresponding threshold values, the network device may judge to be "abnormal".

(11) In Embodiment 2, a threshold value may be set to the communication time 32, in the same manner as the measurement count 24 in Embodiment 1. When the communication time 32 does not exceed the threshold value, the network device may judge to be "abnormal".

(12) In Embodiment 2, the communication time is measured when a local device transmits an access request to the network device and establishes communication with the network device. However, it is possible to measure communication time as long as the communication is performed between the network device and the local device.

(13) In Embodiment 3, the abnormality determination is performed based on a specific host name that is understandable by a human and corresponds to the global IP address of the network device. However, it is possible to use a global IP address and a subnet mask corresponding to the global IP address, instead of a host name. The subnet mask is acquired by making an inquiry to a broadband router or the like.

(14) In Embodiment 1 described above, the authentication processing is performed when a result of the abnormality judgment is "abnormal". However, it is possible to perform abnormality determination based on the host name information 40 before the authentication processing, when a result of the abnormality judgment is "abnormal". In this case, when a result of the abnormality determination is "abnormal", the authentication processing is performed. When a result of the abnormality determination is "normal", access restriction is not performed. In a case where the operating environment has changed to a degree that exceeds a predetermined reference limit due to malfunction, replacement, etc., and not because of theft or the like, the ISP from which the network device receives service does not usually change. Therefore, it is possible to use the network device without authentication.

Also, the abnormality judgment based on the local device information may not be performed, and only the abnormality determination based on the host name information 40 may be performed. In this case, when a result of the abnormality determination is "abnormal", the authentication processing is performed. When a result of the abnormality determination is "normal", access restriction is not performed.

(15) A control program comprising program code for causing a processor of the network device to execute the operations (see FIGS. 6, 7, 9, 10, 13, and 14) of the home server shown in Embodiments 1 to 3 described above may be stored in a recording medium. Also, the control program may be distributed via communication channels or the like. The recording medium may be an IC card (Integrated Circuit Card), a hard disk, an optical disc, a flexible disk, a ROM (Read Only Memory), etc. After being distributed, the control program is stored in a memory or the like that is readable by a processor, and thereby provided for use. The processor executes the control program so that the operations described in the above embodiments are performed.

Figure 16:
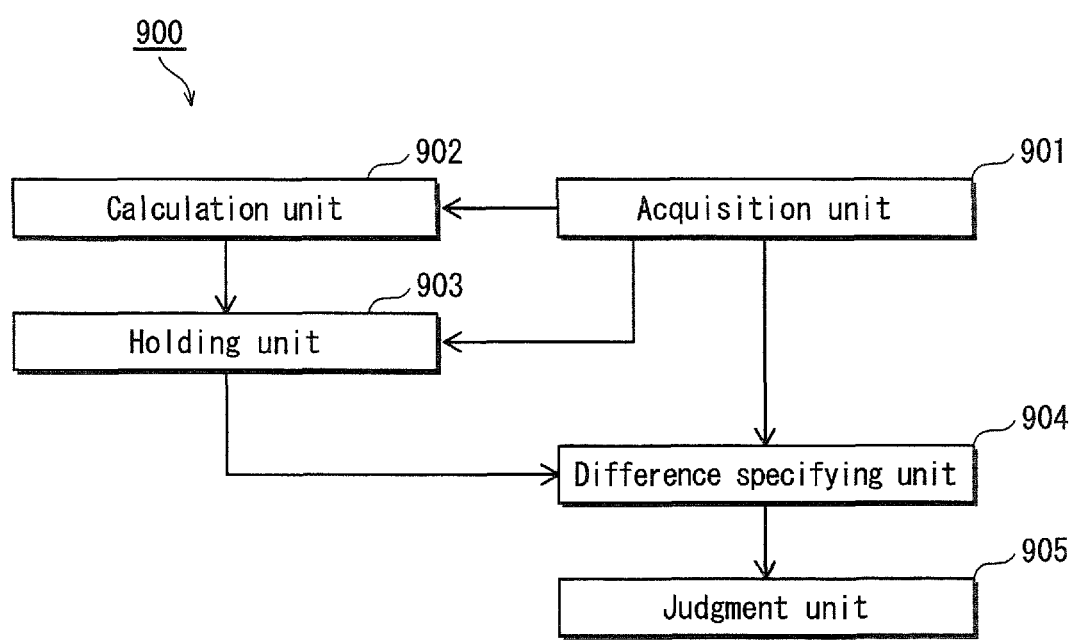
FIG. 16 is a block diagram showing a network device according to another embodiment of the present invention.

(16) Furthermore, regarding the network device shown in FIG. 16, the functional structure thereof does not need to be realized as a single device. Instead, part or an entirety of the functional structure of the network device may be realized by an IC (Integrated Circuit) used in the network device, such as an LSI (Large Scale Integration).

The following describes a structure of a network device according to an embodiment of the present invention, and modifications and advantageous effects thereof.

(a) One aspect of the present invention is a network device (see FIG. 16) that restricts access to predetermined information held therein, the network device comprising: an acquisition unit (acquisition unit 901) operable to communicate with one or more local devices that are in a communicable state within the same local area network as the network device, and acquire one or more identification information pieces corresponding thereto; a calculation unit (calculation unit 902) operable, for each local device whose identification information piece has been acquired, to calculate an index value of the local device based on a past communication therewith, the index value used for judging whether to restrict the access and for estimating an existence probability of the local device, the existence probability being a ratio at which the local device exists in a communicable state; a holding unit (holding unit 903) operable, for each local device whose identification information piece was acquired before a given time point, to hold the identification information piece of the local device and the index value thereof calculated by the calculation unit; a difference specifying unit (difference specifying unit 904) operable to specify a difference between (i) one or more identification information pieces acquired after the given time point and (ii) the one or more identification information pieces acquired before the given time point, thereby specifying one or more local devices as the difference; and a judgment unit (judgment unit 905) operable to judge whether to restrict the access based on the index value of each local device specified as the difference. According to the stated structure, the network device ensures security by performing abnormality judgment based on a communication status with the local devices, and restricts access to the predetermined information based on a result of the abnormality judgment. Therefore, the network device is usable even in a place where a radio wave from a base station cannot be received. Note that the acquisition unit 901 may be composed of the acquisition unit 102 and the temporary holding unit 103 in Embodiment 1; the calculation unit 902 may be composed of the index value calculation unit 104 in Embodiment 1; the holding unit 903 may be composed of the holding unit 105 in Embodiment 1; the difference specifying unit 904 may be composed of the difference specifying unit 106 in Embodiment 1; and the judgment unit 905 may be composed of the judgment unit 107 and the condition holding unit 108 in Embodiment 1.

(b) The calculation unit may calculate the index value of each local device by counting the number of times the identification information piece of the local device has been successfully acquired, and calculating a ratio of the number of times the identification information piece has been successfully acquired to the number of times the identification information piece has been attempted to be acquired, the difference specifying unit may specify, as the difference, one or more local devices whose identification information pieces are included in the one or more identification information pieces acquired before the given time point, and not included in the one or more identification information pieces acquired after the given time point, and the judgment unit may judge that the access restriction is necessary when the index value of any of the one or more local devices specified as the difference is larger than a predetermined threshold value. In this way, the existence probability of each local device is estimated, enabling access restriction according to the usage pattern. For example, in a case where a device connected as needed and having a low existence probability, such as a mobile device, does not exist within the same LAN at the most recent start-up, the network device is prevented from judging the operating environment to be "abnormal" based on the reason that the device does not exist within the same LAN.

(c) The calculation unit may calculate, as a measurement count of each local device, the number of times the identification information piece of the local device has been attempted to be acquired, and the judgment unit may judge that the access restriction is necessary, when the index value of any of the one or more local devices specified as the difference is larger than a predetermined threshold value and the measurement count thereof is larger than a predetermined count. According to the stated structure, a threshold value is set to the measurement count and used in the abnormality judgment. In this way, in a case where a device whose existence probability is high because the measurement count thereof is lower than a predetermined value, such as a device whose measurement count is "1" and whose existence probability is 100%, does not exist in the same LAN when the network device is started up, the network device is prevented from judging the operating environment to be "abnormal" based on the reason that the device does not exist within the same LAN.

(d) The acquisition unit may acquire an identification information piece of each local device with which communication has been successful, within a predetermined time period from each start-up of the network device, the given time point coincides with the most recent start-up, the difference specifying unit may specify the one or more local devices as the difference by comparing the one or more identification information pieces acquired within the predetermined time period from the most recent start-up, with one or more identification information pieces that were acquired before the most recent start-up and held in the holding unit, the calculation unit may calculate the index value of each local device, based on a communication with the local device performed up to the most recent start-up, and after the predetermined time period has elapsed since the most recent start-up, the judgment unit may judge whether to restrict the access based on the index value of each local device specified as the difference. In this way, the existence probability of each local device is estimated, enabling access restriction according to the usage pattern.

(e) The acquisition unit may repeatedly acquire identification information piece of each local device with which communication has been successful, even after the elapse of the predetermined time period. With the stated structure, while in operation, the network device acquires the identification information pieces of local devices, and updates the identification information pieces held in the holding unit whenever necessary. This makes it possible to increase the accuracy of estimating the existence probability.

(f) The network device may further comprise a control unit operable, when the judging unit judges that the access restriction is necessary, to restrict the access by performing one of processes pertaining to the access restriction, based on the number of local devices specified as the difference and the index value of each of the local devices. With the stated structure, when judging to be "abnormal", the network device does not always perform the same access restriction, but performs a different access restriction according to the index value of each local device specified as a difference.

(g) The difference specifying unit may specify the one or more local devices as the difference by comparing the one or more identification information pieces acquired after the given time point by the acquisition unit, with one or more identification information pieces that were acquired during a predetermined time period that ends at the given time point. With the stated structure, the index value is calculated based on a recent usage pattern, enabling access restriction according to the recent usage pattern.

(h) The calculation unit may include a measuring unit operable, for each local device, to measure communication time between the network device and the local device, and may calculate the index value of the local device by dividing an accumulated communication time between the network device and the local device by a total of the accumulated communication time of every local device, and the judgment unit may judge that the access restriction is unnecessary when the index value of each local device specified as the difference is smaller than or equal to a predetermined threshold value. In this way, the existence probability of each local device is estimated, enabling access restriction according to the usage pattern.

(i) The calculation unit may include a measuring unit operable, for each local device, to measure a communication count that is the number of times the network device has communicated with the local device, and may calculate the index value of the local device by dividing the communication count by a total of the communication count of every local device, and the judgment unit may judge that the access restriction is unnecessary when the index value of each local device specified as the difference is smaller than or equal to a value of a predetermined count. In this way, the existence probability of each local device is estimated, enabling access restriction according to the usage pattern.

(j) The holding unit may refrain from holding the one or more identification information pieces acquired after the given time point, when the judgment unit judges that the access restriction is necessary based on the one or more identification information after the given time point. With the stated structure, when judging to be "abnormal", the network device does not update the local device information based on the identification information pieces of local devices acquired at the most recent start-up. Therefore, in an operating environment at the time of theft, the network device is prevented from holding the local device information in the operating environment while being repeatedly started up, and from judging to be "normal" from a certain time point while being repeatedly started up.

(k) The network device may further comprise: a circuit for accessing the predetermined information; and a control unit operable to cut off a power supply to at least a part of the circuit, when the judgment unit judges that the access restriction is necessary. With the stated structure, when judging that access restriction is necessary, the network device switches off its own power. This makes it possible to protect the contents held therein at the time of theft or the like.

(l) The control unit may be further operable to output an input request for inputting predetermined authentication information piece, to perform authentication processing based on authentication information piece that has been input, and when the authentication processing is successful, to refrain from cutting off a power supply to the circuits. With the stated structure, when judging to be "abnormal", but completing the subsequent authentication processing successfully, the network device does not perform access restriction. Therefore, in a case where the operating environment has changed to a degree that exceeds a predetermined reference limit due to malfunction, replacement, etc., and not because of theft or the like, the network device becomes usable after the authentication processing.

(m) The control unit may include: a detection unit operable to detect a host name corresponding to a global IP address of the network device; a common part specifying unit operable to specify a common part in a plurality of host names detected before the given time point; a storage unit operable to store the host names and the common part; and a determination unit operable to determine whether the common part matches a corresponding part, which corresponds to the common part, of a host name detected after the given time point, by comparing the common part with the corresponding part of the host name, and the control unit neither outputs the input request nor cuts off the power supply when the determination unit determines that the common part matches the corresponding part of the host name. With the stated structure, when judging to be "abnormal", the network device performs abnormal determination based on a host name, before the authentication processing. Therefore, in a case where the operating environment has changed to a degree that exceeds a predetermined reference limit due to malfunction, replacement, etc., but the ISP of the network device has not changed, the network device is usable without the authentication processing.

(n) The network device may further comprise a decryption unit, wherein the predetermined information may have been encrypted, and the decryption unit may be operable to decrypt the predetermined information in response to a request for accessing the predetermined information. With the stated structure, when the power of the network device is switched off due to access restriction, the contents held in the hard disk, etc. cannot be decrypted. This makes it possible to protect the contents more reliably.

(o) The network device may further comprise: a detection unit operable to detect a host name corresponding to a global IP address of the network device; a common part specifying unit operable to specify a common part in a plurality of host names detected before the given time point; a storage unit operable to store the host names and the common part; and a determination unit operable to determine whether the common part matches a corresponding part, which corresponds to the common part, of a host name detected after the given time point, by comparing the common part with the corresponding part of the host name, wherein the judgment unit judges whether to restrict the access based on a result of the determination as well as the index value of each local device specified as the difference. With the stated structure, the network device performs abnormality judgment based on the index values that are used to estimate the existence probability of each local device specified as a difference, and also performs abnormality determination by determining, based on a host name corresponding to the global IP address thereof, whether the ISP thereof is changed. This makes it possible to more reliably judge whether to perform access restriction.

INDUSTRIAL APPLICABILITY

A network device according to the present invention is applicable to a home server or the like that holds information to be protected and requires security to be ensured.

REFERENCE SIGNS LIST 100, 600 network device
101 network interface
102 acquisition unit
103 temporary holding unit
104 index value calculation unit
105 holding unit
106 difference specifying unit
107, 606 judgment unit
108 condition holding unit
109, 607 control unit
110 output unit
111 input unit
601 detection unit
602 temporary storage unit
603 common part specifying unit
604 storage unit
605 determination unit

The invention claimed is:

1. A network device that restricts access to predetermined information held therein, the network device comprising:
   an acquisition unit that communicates with one or more local devices that are in a communicable state within a same local area network as the network device, and acquires one or more identification information pieces corresponding thereto;
   a calculation unit that, for each local device whose identification information piece has been acquired, calculates an index value of the local device based on a past communication therewith, the index value being used for judging whether to restrict the access and for estimating an existence probability of the local device, and the existence probability being a ratio at which the local device exists in the communicable state;
   a holding unit that, for each local device whose identification information piece was acquired before a given time point, holds the identification information piece of the local device and the index value thereof calculated by the calculation unit;
   a difference specifying unit that specifies a difference between (i) one or more identification information pieces acquired after the given time point and (ii) the one or more identification information pieces acquired before the given time point, so as to specify one or more of the local devices as the difference; and
   a judgment unit that judges whether to restrict the access based on the index value of each local device specified as the difference:
   wherein the difference specifying unit specifies the one or more of the local devices as the difference by comparing the one or more identification information pieces acquired after the Riven time point by the acquisition unit, with one or more identification information pieces that were acquired during a predetermined time period that ends at the given time point.

2. The network device of claim 1, wherein
   the calculation unit calculates the index value of each local device by counting a number of times the identification information piece of the local device has been successfully acquired, and calculating a ratio of the number of times the identification information piece has been successfully acquired to a number of times the identification information piece has been attempted to be acquired,
   the difference specifying unit specifies, as the difference, one or more of the local devices whose identification information pieces are included in the one or more identification information pieces acquired before the given time point, and not included in the one or more identification information pieces acquired after the given time point, and the judgment unit judges that the access restriction is necessary when the index value of any of the one or more of the local devices specified as the difference is larger than a predetermined threshold value.

3. The network device of claim 2, wherein the calculation unit calculates, as a measurement count of each local device, the number of times the identification information piece of the local device has been attempted to be acquired, and the judgment unit judges that the access restriction is necessary, when the index value of any of the one or more of the local devices specified as the difference is larger than the predetermined threshold value and the measurement count thereof is larger than a predetermined count.

4. The network device of claim 3, wherein the acquisition unit acquires an identification information piece of each local device with which communication has been successful, within a predetermined time period from each start-up of the network device, the given time point coincides with a most recent start-up, the difference specifying unit specifies the one or more of the local devices as the difference by comparing the one or more identification information pieces acquired within the predetermined time period from the most recent start-up, with one or more identification information pieces that were acquired before the most recent start-up and held in the holding unit, the calculation unit calculates the index value of each local device, based on a communication with the local device performed up to the most recent start-up, and after the predetermined time period has elapsed since the most recent start-up, the judgment unit judges whether to restrict the access based on the index value of each local device specified as the difference.

5. The network device of claim 4, wherein the acquisition unit repeatedly acquires the identification information piece of each local device with which communication has been successful, even after an elapse of the predetermined time period.

6. The network device of claim 4, further comprising a control unit that, when the judging unit judges that the access restriction is necessary, restricts the access by performing one of processes pertaining to the access restriction, based on a number of local devices specified as the difference and the index value of each of the local devices.

7. The network device of claim 1, wherein the calculation unit includes a measuring unit that, for each local device, measures a communication time between the network device and the local device, and calculates the index value of the local device by dividing an accumulated communication time between the network device and the local device by a total of the accumulated communication time of every local device, and the judgment unit judges that the access restriction is unnecessary when the index value of each local device specified as the difference is smaller than or equal to a predetermined threshold value.

8. The network device of claim 1, wherein the calculation unit includes a measuring unit that, for each local device, measures a communication count that is a number of times the network device has communicated with the local device, and calculates the index value of the local device by dividing the communication count by a total of the communication count of every local device, and the judgment unit judges that the access restriction is unnecessary when the index value of each local device specified as the difference is smaller than or equal to a value of a predetermined count.

9. The network device of claim 1, wherein the holding unit refrains from holding the one or more identification information pieces acquired after the given time point, when the judgment unit judges that the access restriction is necessary based on the one or more identification information pieces acquired after the given time point.

10. The network device of claim 1, further comprising:

a circuit for accessing the predetermined information; and a control unit that cuts off a power supply to at least a part of the circuit, when the judgment unit judges that the access restriction is necessary.

11. The network device of claim 10, wherein the control unit further outputs an input request for inputting a predetermined authentication information piece, to perform authentication processing based on an authentication information piece that has been input, and when the authentication processing is successful, refrains from cutting off the power supply to the circuit.

12. The network device of claim 11, wherein the control unit includes:

a detection unit that detects a host name corresponding to a global IP address of the network device;

a common part specifying unit that specifies a common part in a plurality of host names detected before the given time point;

a storage unit that stores the host names and the common part; and a determination unit that determines whether the common part matches a corresponding part, which corresponds to the common part, of a host name detected after the given time point, by comparing the common part with the corresponding part of the host name detected after the Riven time point, and wherein the control unit neither outputs the input request nor cuts off the power supply when the determination unit determines that the common part matches the corresponding part of the host name detected after the Riven time point.

13. The network device of claim 10: further comprising a decryption unit, wherein the predetermined information has been encrypted, and the decryption unit is decrypts the predetermined information in response to a request for accessing the predetermined information.

14. The network device of claim 1: further comprising:

a detection unit that detects a host name corresponding to a global IP address of the network device;

a common part specifying unit that specifies a common part in a plurality of host names detected before the given time point;

a storage unit that stores the host names and the common part; and a determination unit that determines whether the common part matches a corresponding part, which corresponds to the common part, of a host name detected after the given time point, by comparing the common part with the corresponding part of the host name detected after the given time point, wherein the judgment unit judges whether to restrict the access based on a result of the determination as well as the index value of each local device specified as the difference.

15. A judgment method for judging whether to restrict access to predetermined information held in a network device, the judgment method comprising:
    an acquisition step of communicating with one or more local devices that are in a communicable state within a same local area network as the network device, and acquiring one or more identification information pieces corresponding thereto;
    a calculation step of calculating, for each local device whose identification information piece has been acquired, an index value of the local device based on a past communication therewith, the index value being used for judging whether to restrict the access and for estimating an existence probability of the local device, and the existence probability being a ratio at which the local device exists in the communicable state;
    a holding step of holding, for each local device whose identification information piece was acquired before a given time point, the identification information piece of the local device and the index value thereof calculated by the calculation step;
    a difference specifying step of specifying a difference between (i) one or more identification information pieces acquired after the given time point and (ii) the one or more identification information pieces acquired before the given time point, so as to specify one or more of the local devices as the difference; and
    a judgment step of judging whether to restrict the access based on the index value of each local device specified as the difference,
    wherein the difference specifying step specifies the one or more of the local devices as the difference by comparing the one or more identification information pieces acquired after the given time point by the acquisition step, with one or more identification information pieces that were acquired during a predetermined time period that ends at the given time point.

16. A non-transitory computer-readable recording medium having a computer program recorded thereon, the computer program causing a network device to perform judgment processing for judging whether to restrict access to predetermined information held in the network device, and the computer program causing a computer to execute a method comprising:
    an acquisition step of communicating with one or more local devices that are in a communicable state within a same local area network as the network device, and acquiring one or more identification information pieces corresponding thereto;
    a calculation step of calculating, for each local device whose identification information piece has been acquired, an index value of the local device based on a past communication therewith, the index value being used for judging whether to restrict the access and for estimating an existence probability of the local device, and the existence probability being a ratio at which the local device exists in the communicable state;
    a holding step of holding, for each local device whose identification information piece was acquired before a given time point, the identification information piece of the local device and the index value thereof calculated by the calculation step;
    a difference specifying step of specifying a difference between (i) one or more identification information pieces acquired after the given time point and (ii) the one or more identification information pieces acquired before the given time point, so as to specify one or more of the local devices as the difference; and
    a judgment step of judging whether to restrict the access based on the index value of each local device specified as the difference,
    wherein the difference specifying step specifies the one or more of the local devices as the difference by comparing the one or more identification information pieces acquired after the given time point by the acquisition step, with one or more identification information pieces that were acquired during a predetermined time period that ends at the given time point.

17. An integrated circuit used to judge, in a network device, whether to restrict access to predetermined information held in the network device, the integrated circuit comprising:
    an acquisition unit that communicates with one or more local devices that are in a communicable state within a same local area network as the network device, and acquires one or more identification information pieces corresponding thereto;
    a calculation unit that, for each local device whose identification information piece has been acquired, to calculates an index value of the local device based on a past communication therewith, the index value being used for judging whether to restrict the access and for estimating an existence probability of the local device, and the existence probability being a ratio at which the local device exists in the communicable state;
    a holding unit that, for each local device whose identification information piece was acquired before a given time point, to holds the identification information piece of the local device and the index value thereof calculated by the calculation unit;
    a difference specifying unit that specifies a difference between (i) one or more identification information pieces acquired after the given time point and (ii) the one or more identification information pieces acquired before the given time point, so as to specify thereby specifying one or more of the local devices as the difference; and
    a judgment unit that judges whether to restrict the access based on the index value of each local device specified as the difference,
    wherein the difference specifying unit specifies the one or more of the local devices as the difference by comparing the one or more identification information pieces acquired after the Riven time point by the acquisition unit, with one or more identification information pieces that were acquired during a predetermined time period that ends at the Riven time point.

* * * * *